US010379817B2

(12) United States Patent
Huebra et al.

(10) Patent No.: US 10,379,817 B2
(45) Date of Patent: Aug. 13, 2019

(54) COMPUTER-APPLIED METHOD FOR DISPLAYING SOFTWARE-TYPE APPLICATIONS BASED ON DESIGN SPECIFICATIONS

(71) Applicants: Nadia Analia Huebra, Buenos Aires (AR); Mariano Huebra, Buenos Aires (AR)

(72) Inventors: Nadia Analia Huebra, Buenos Aires (AR); Mariano Huebra, Buenos Aires (AR)

( * ) Notice: Subject to any disclaimer, the term of this patent is extended or adjusted under 35 U.S.C. 154(b) by 0 days.

(21) Appl. No.: 15/154,660

(22) Filed: May 13, 2016

(65) Prior Publication Data

US 2017/0068519 A1     Mar. 9, 2017

Related U.S. Application Data

(60) Provisional application No. 62/161,216, filed on May 13, 2015.

(51) Int. Cl.
| | | |
|---|---|---|
| *G06F 9/44* | (2018.01) | |
| *G06F 8/20* | (2018.01) | |
| *G06F 8/35* | (2018.01) | |
| *G06F 9/445* | (2018.01) | |

(52) U.S. Cl.
CPC ............ *G06F 8/20* (2013.01); *G06F 8/35* (2013.01); *G06F 9/445* (2013.01)

(58) Field of Classification Search
CPC .. G06F 7/78; G06F 8/00–78; G06F 9/44–455; G06F 11/36; G06F 8/20; G06F 8/35; G06F 9/445

USPC ......................................................... 717/105
See application file for complete search history.

(56) References Cited

U.S. PATENT DOCUMENTS

| | | | |
|---|---|---|---|
| 6,289,513 B1 | 9/2001 | Bentwich | |
| 8,255,869 B2 | 8/2012 | Weatherhead | |
| 2002/0062475 A1 | 5/2002 | Iborra et al. | |
| 2002/0077823 A1 | 6/2002 | Fox et al. | |
| 2003/0028579 A1 | 2/2003 | Kulkarni et al. | |
| 2004/0107414 A1* | 6/2004 | Bronicki ................... G06F 8/34 717/105 |
| 2006/0015839 A1 | 1/2006 | Owens et al. | |
| 2007/0157179 A1* | 7/2007 | Seeger ...................... G06F 8/34 717/136 |

(Continued)

OTHER PUBLICATIONS

Office Action, co-pending U.S. Appl. No. 15/414,748; dated May 22, 2018.

(Continued)

*Primary Examiner* — Anna C Deng
(74) *Attorney, Agent, or Firm* — The Morales Law Firm; Joseph L. Morales

(57) ABSTRACT

System and method that automatically instantiates and displays software-type applications based on software design specifications that based on the input of logical structures of information in an electronic device, automatically identifies, validates and store functional and visual design component based on software specifications stored on a database memory. The method automatically creates functional and visual models and store those models and finally automatically display on a device the application interface, functional and visual models combined with other protocols stored in memory using the processor as an instantiator.

8 Claims, 17 Drawing Sheets

(56) References Cited

U.S. PATENT DOCUMENTS

| | | | |
|---|---|---|---|
| 2008/0016176 A1* | 1/2008 | Leitner | A63F 13/10 709/217 |
| 2008/0222073 A1* | 9/2008 | Seeger | G06F 8/34 706/48 |
| 2009/0183092 A1 | 7/2009 | Naghshineh | |
| 2010/0160039 A1* | 6/2010 | Nathan | A63F 13/12 463/31 |
| 2011/0088011 A1 | 4/2011 | Ouali | |
| 2011/0246961 A1* | 10/2011 | Tripathi | G06F 8/34 717/105 |
| 2012/0110558 A1 | 5/2012 | Anan et al. | |
| 2012/0210296 A1 | 8/2012 | Boulter | |
| 2014/0109037 A1* | 4/2014 | Ouali | G06F 8/10 717/105 |
| 2017/0003937 A1 | 1/2017 | Huebra | |

OTHER PUBLICATIONS

Office Action, co-pending U.S. Appl. No. 15/141,748; dated Aug. 2, 2017.

* cited by examiner

Figure 2:
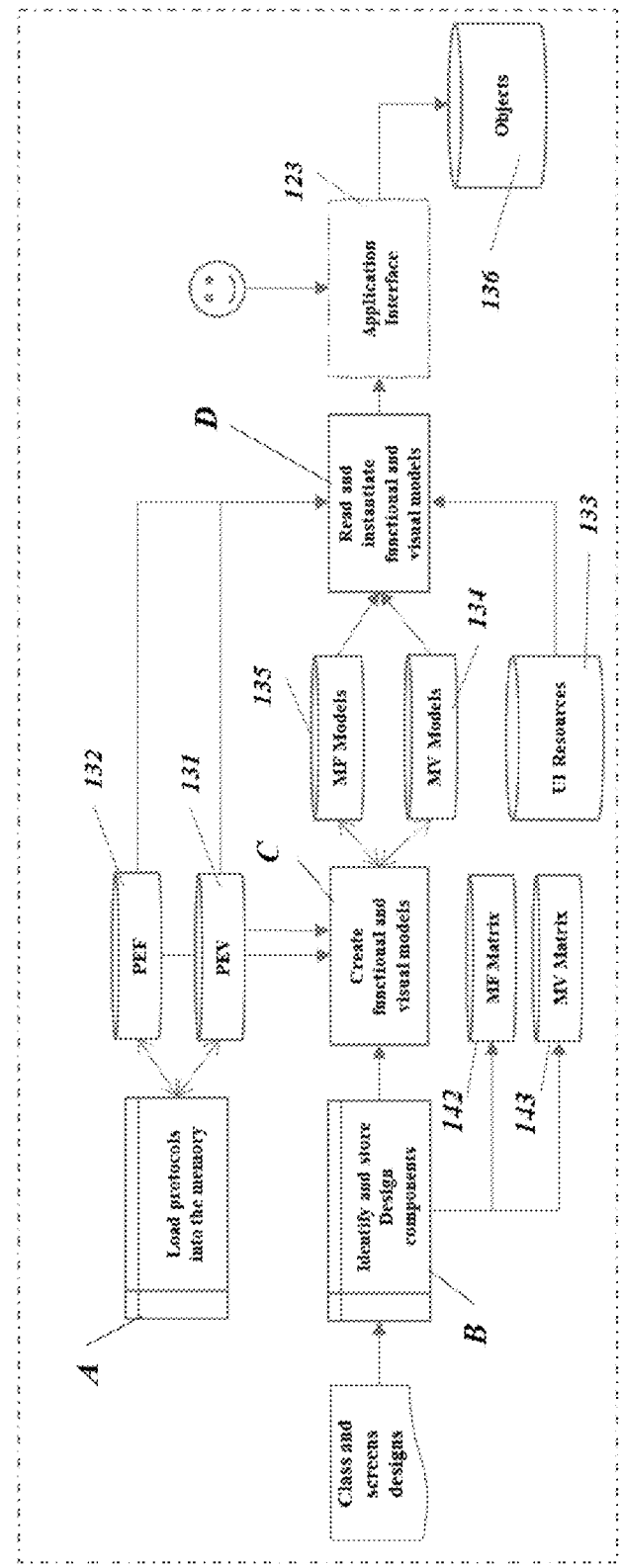
Figure 2A:
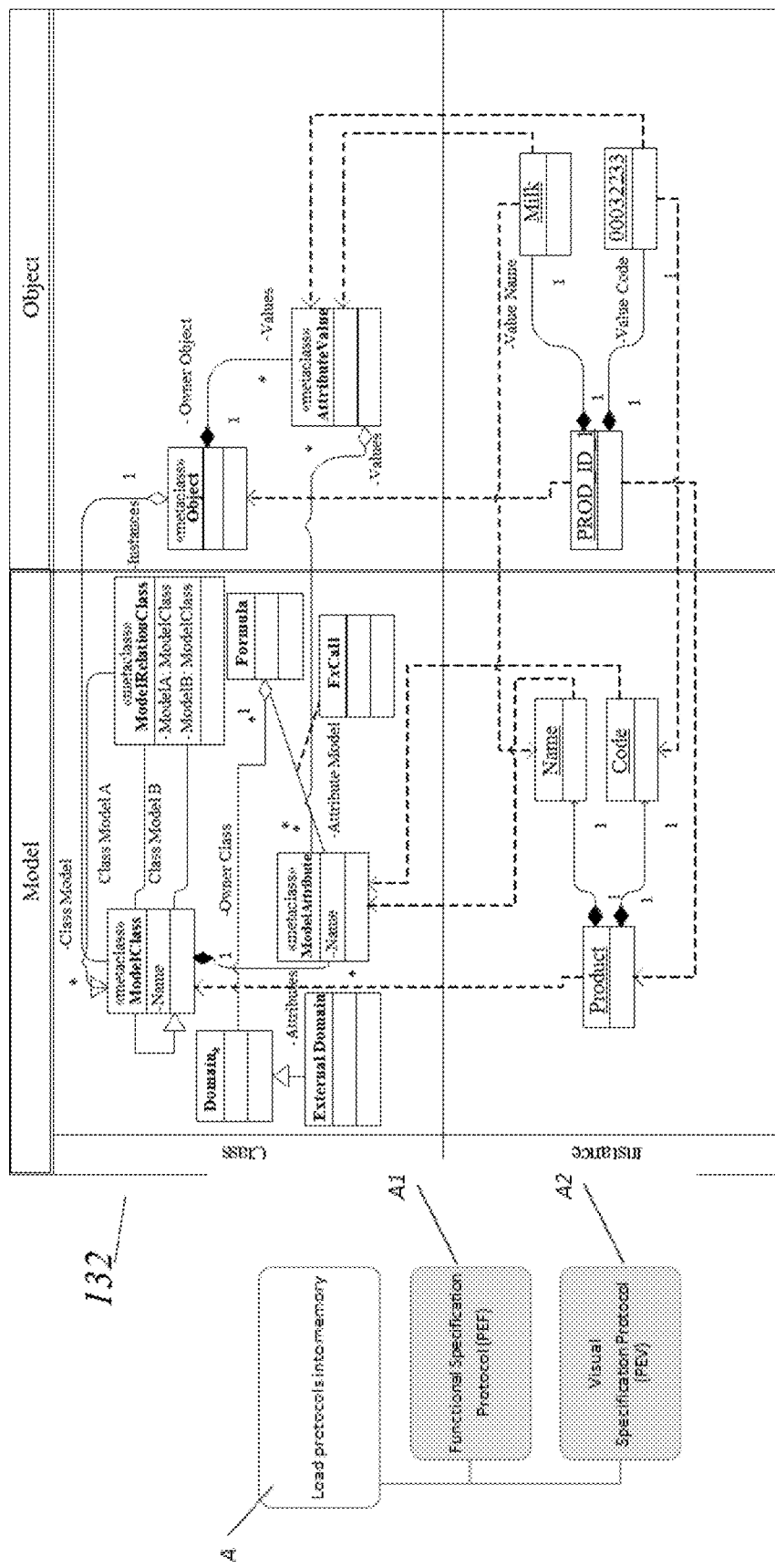

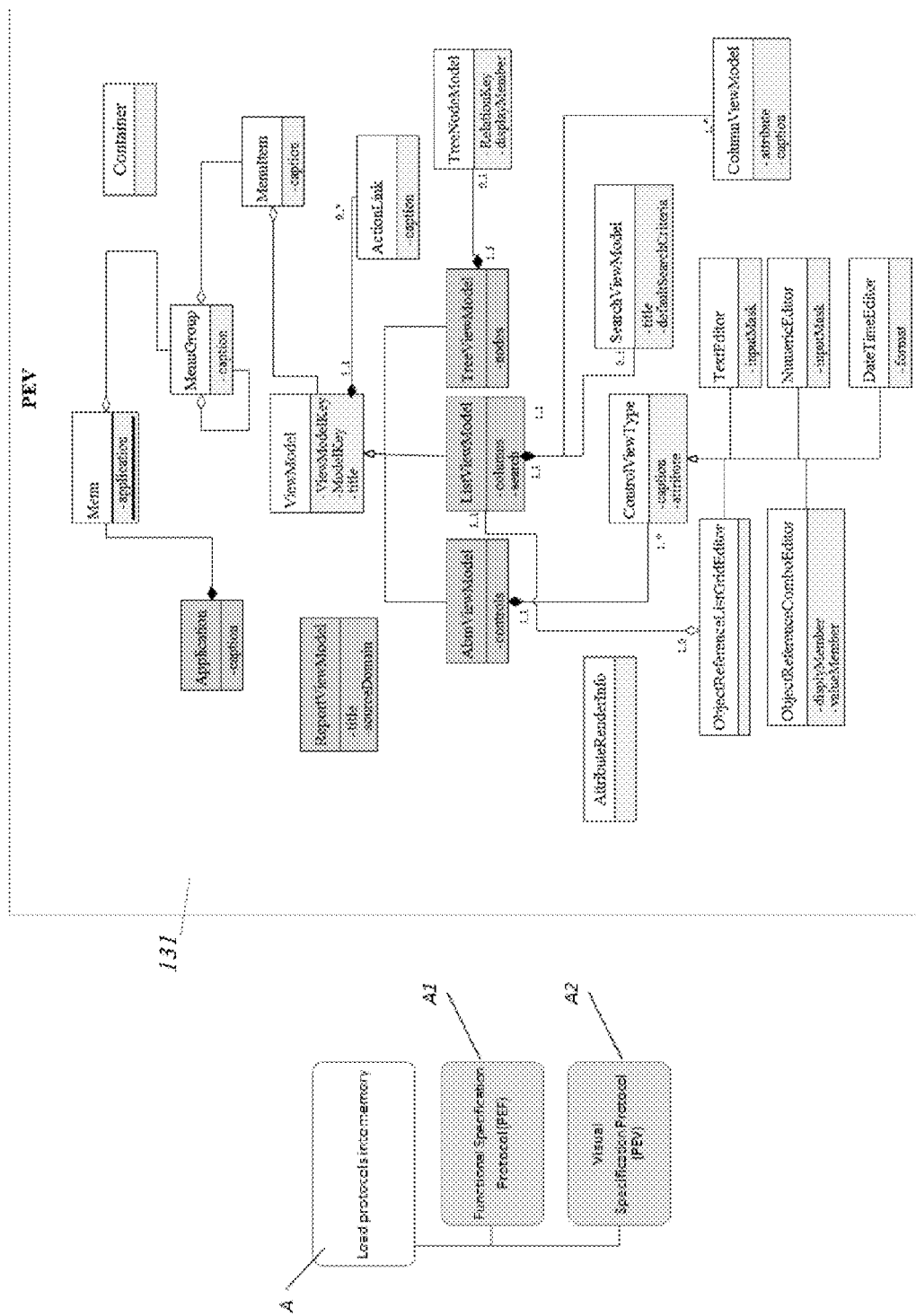
FIG. 2A above

Figure 1:
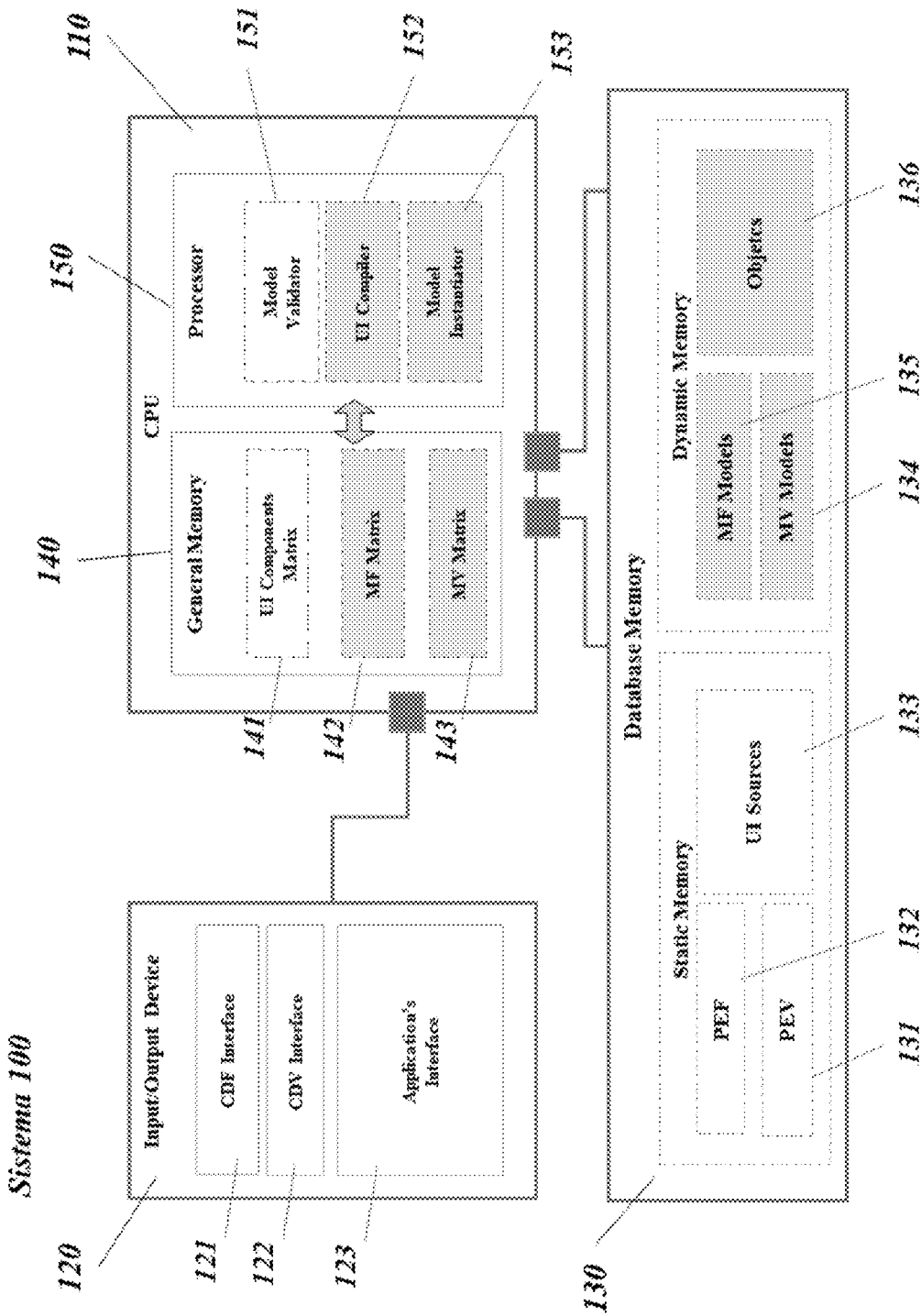
Figure 2B:
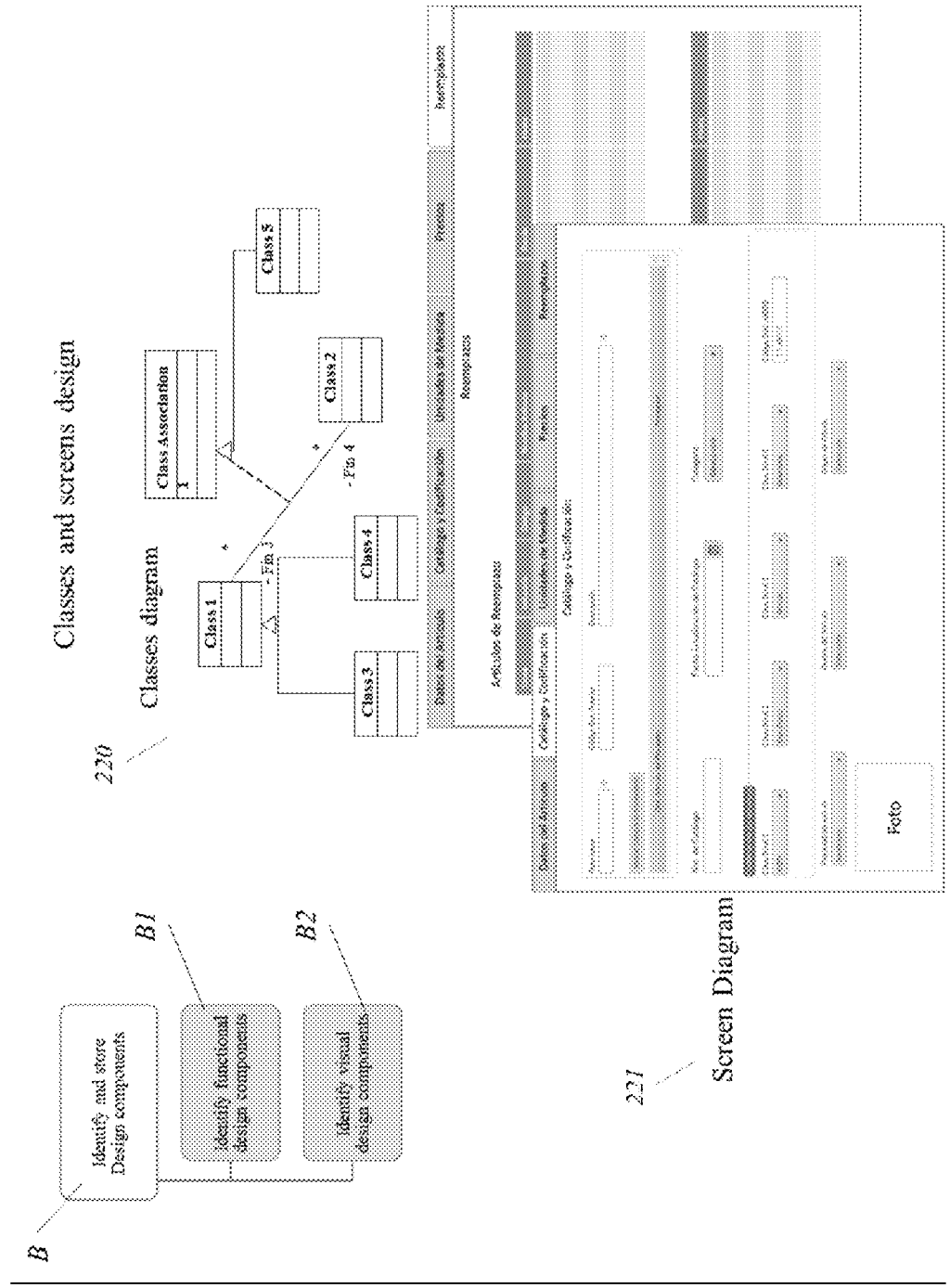

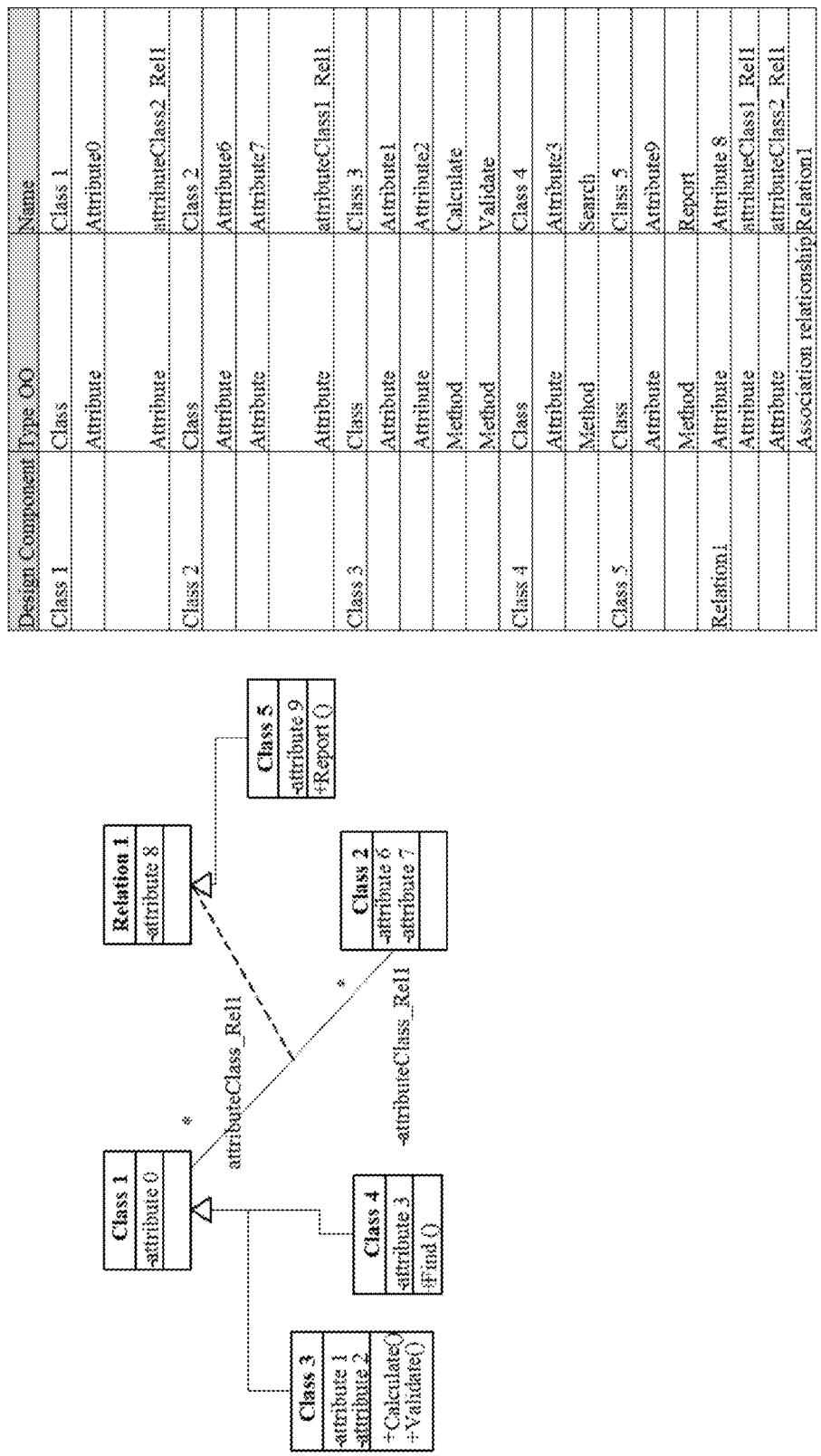
FIG. 2B1

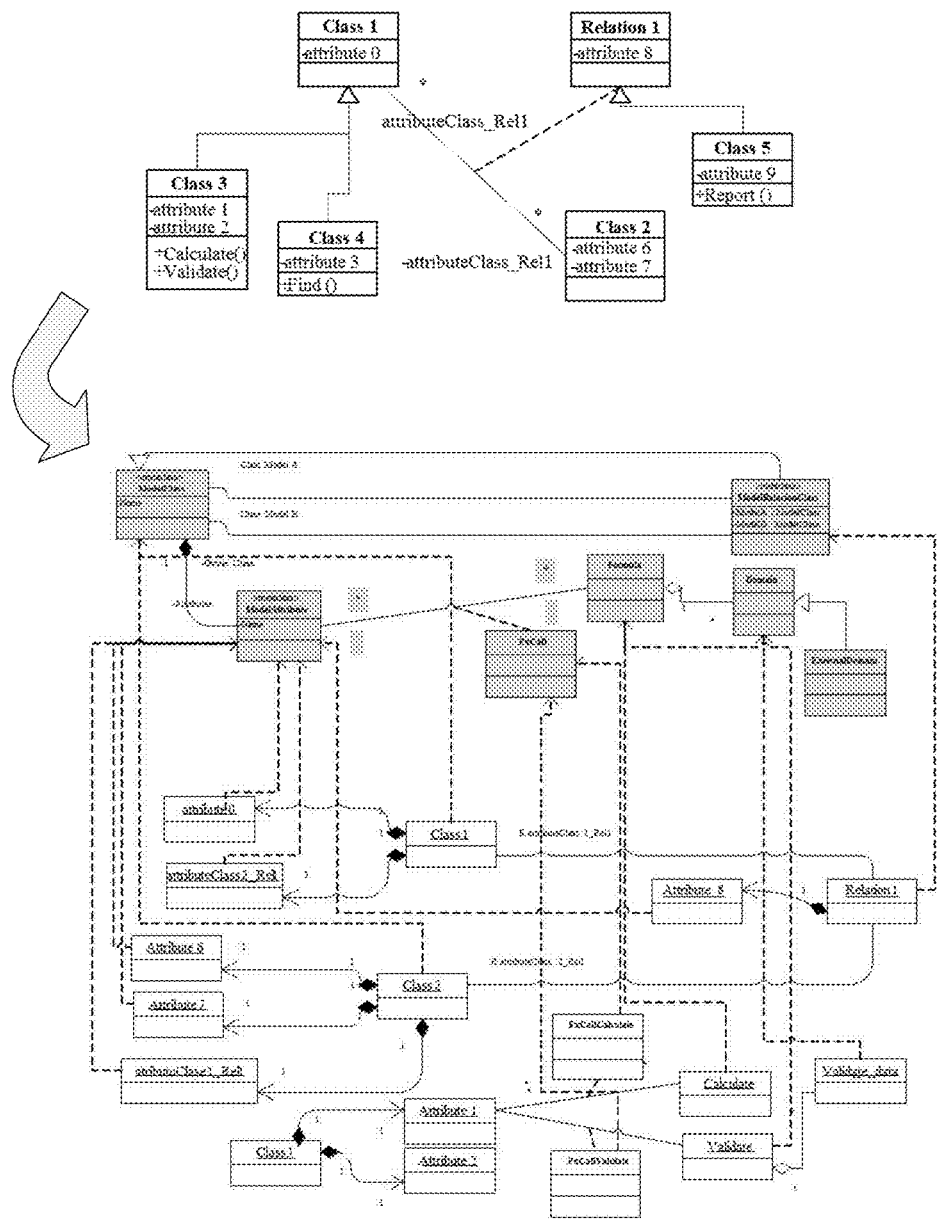

Figure 2C:
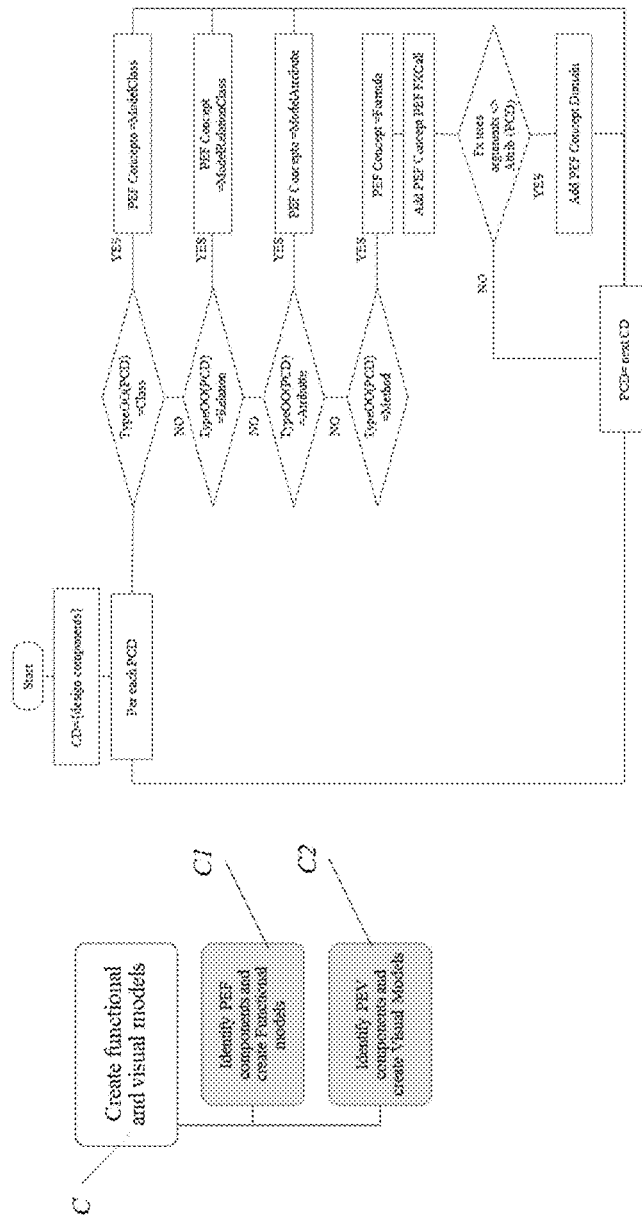

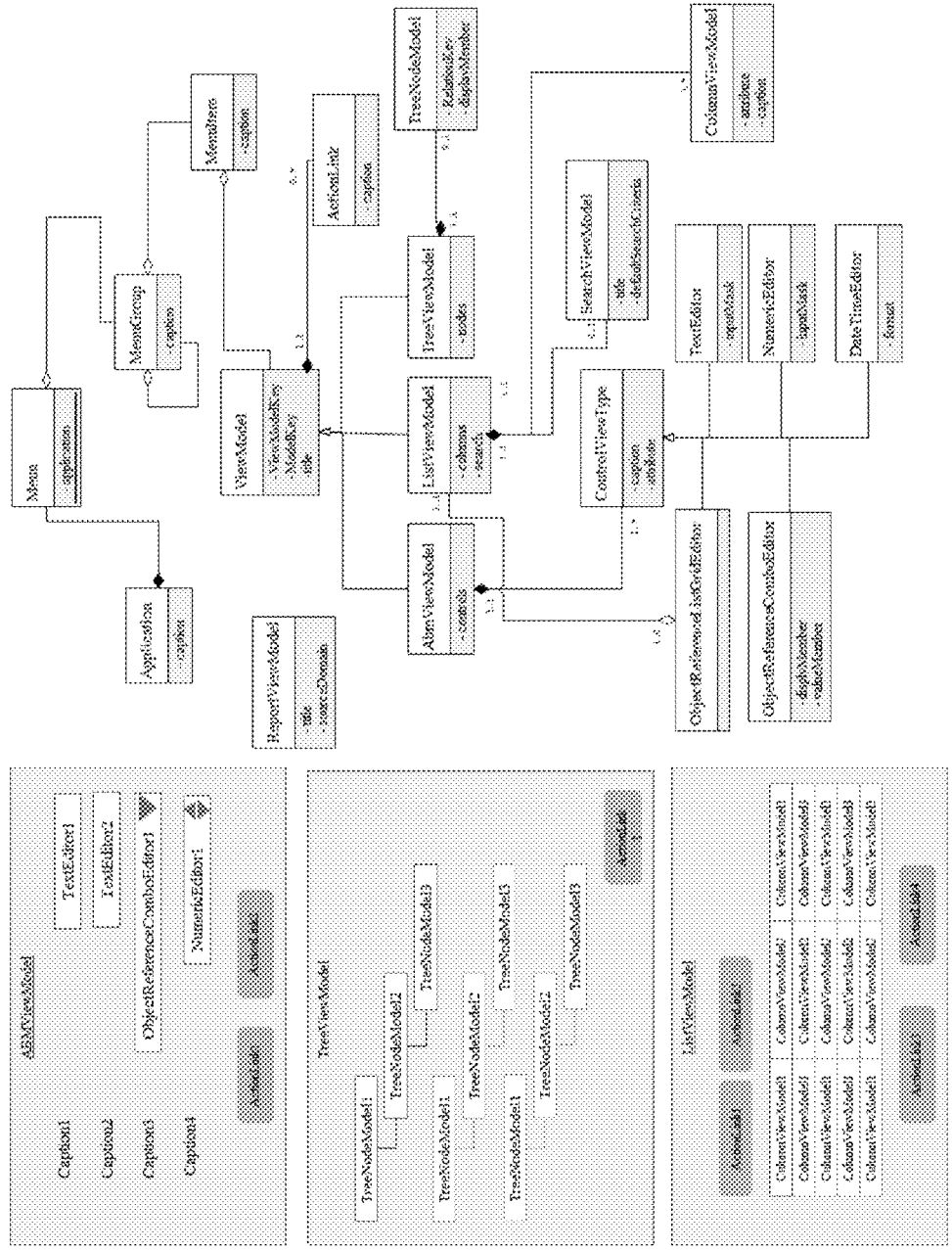
FIG. 2C2

COMPUTER-APPLIED METHOD FOR DISPLAYING SOFTWARE-TYPE APPLICATIONS BASED ON DESIGN SPECIFICATIONS

1. CROSS-REFERENCE TO RELATED APPLICATIONS

This application claims priority over provisional patent application U.S. No. 62/161,216 titled "Método implementado por computador que expone las aplicaciones tipo software apartir de especificación de diseño" (Method employed by a computer for exposing software-type applications based on design specifications), filed 13 May 2015, by the same inventors of this application. The aforementioned provisional application content is incorporated in its entirety by reference, as if it were disclosed in the present document.

2. FIELD OF THE INVENTION

This invention is a system and method carried out by a computer to automatically produce fully operational software-type applications based on software design specifications.

This system enables the user to enter class designs and screen designs (software design specifications) through an input/output device. The processor applies two protocols to automatically create functional and visual models that are stored in a memory database. Then, it combines these models with graphic components, and instantiates the software-type applications without generating a compilable code. These applications are presented to the user to be operated and produce information as a result.

3. PRIOR ART

The software industry proposes a series of activities as a mechanism to produce solutions among which the construction of a data base and the coding of a computer program can be found. These activities work within the framework of an architecture that will allow the resulting software to operate in multiple user environments. Such tasks are performed by people qualified in understanding software design and from there develop the program. The nature of these tasks determines that making software is carried out by a team where the following specialized profiles stand out:

- Architect: Defines the application layer architecture taking into account end user environment. Examples of architectures are SOA (Service-oriented architecture), Client Server, etc.
- Database programmer: builds the structures where user generated data while using the application will be stored. There are tools called database engines based on different technologies but which currently work under common, already established standards.
- Application programmer: Writes the program's code in a specific language (Java, C#, Vbnet, etc), which is then compiled to obtain the object's code that the computer will execute, producing the final application that the user will access.
- User Interface designer: Designs screens, visual components, and graphic style templates that enable the computer program to appear user-friendly and easy to use.

In order to create software, it is necessary to rely on a professional team like the one mentioned above, since normally someone needing to create software does not have the aforementioned skills, which demand several years of study.

The problem that arises in the software industry has different dimensions such as:

i. The demand for solutions grows worldwide at a rate faster than that required to train professionals in this field. Thus, a large unmet development demand can be observed.

ii. The process of writing software is expensive and takes a lot of time, which implies that the sectors demanding it will not being able to meet all their needs efficiently and conveniently.

iii. The various technologies (databases, programming languages, architectures, user interfaces) that evolve at a fast pace generate in already developed applications a problem of technological obsolescence. This means that when a software is operational, normally new technologies arise, adopted by industry professionals. The upgrade of such software implies a re-engineering effort as important as when it was initially created.

iv. The constant change of business operation rules in a vertiginous global economy, demands adaptation and improvements to software applications, which are commonly unfeasible due to the combination of money/time factors with technological obsolescence. For this reason, software applications do not offer timely and flexible evolution.

Prior art reveals a myriad of systems and methods for automatically generating software in order to reduce time and costs in software application development life cycles. US2006/0015839 discloses a system and method that generate J2EE compilable source code, based on two possible sources, a database where all parameters, charts and architecture of the system to be developed are clearly specified, meaning that detailed knowledge of the technical design is required as input. Based on this detailed definition, and XML file is written and which can be altered by the user to adjust design. The final XML document is processed by a framework tool which automatically generates J2EE code, and the system architecture. A form tool automatically produces user interface forms, also based on structures clearly defined within the XML source document. A system deployment tool integrates the source database and the program code into a compilable structure resulting in the software application.

Unlike the present invention, US2006/00115839 generates J2EE compilable code and requires prior knowledge of the program's computing architecture and its database structure, object parameters and table fields. Also, detailed knowledge of XML and in some cases direct code injection is required to execute some tasks not performed by the configuration and edition programs mentioned.

Similarly, US2002/0077823 discloses a method and a system to create software applications that can run in multiple client platforms, particularly including voice operated platforms, which implies a voice-recognition method for interpreting it as input data. For example, a cell phone user with limited screen or keyboard access can get information on a web page on audio format, and could interact in return with the website through words and sentences spoken rather than written. The aforementioned document limits itself to speech recognition, to transform it into text, which is subsequently treated as any other application input data. Unlike the present invention, such document does not set out to build a software model, nor its architecture documents or specifications automatically. Such document is based on VoiceXML, the standard language for voice components specification. To interpret the commands received, it uses voice conversation templates that can be modified manually, which are manual scripts used by the programmer to map the flow of commands received and the answers the application should provide. In order to define speech recognition verbal phrases that the application can recognize when uttered by the user, the developer should create "a grammar", which is an explicit characterisation of expected spoken commands and it serves to restrict input to such commands, which are a small number of allowed word sequences.

The system laid out in this patent also includes a mechanism for the programmer to define a "natural language grammar", which allows for easy training of the application on the type of answers expected, based on templates with their own phrases. After that, it is necessary for the programmer to manually map the spoken components identified with application variables in order to be subsequently processed. Finally, to ensure such oral components are properly identified, it is necessary to have a database of acoustic patterns and pronunciations. Such document provides a mechanism to obtain voice commands and transform them into an application's input variables, and consequently offer the opposite case to expose output variables in the form of self-generated voice commands. To do so, the application relies on the specification of "natural language grammar" and "language models", but unlike this invention, it does not disclose the ability to directly analyse natural language input in a free and exhaustive way, for automatically inferring software models, or an application's functional or design components.

Similarly, US2012/0210296 discloses a method to create BPM-type (Business Process Management) software applications. It uses pre-built software modules, which represent different process-related functions. These are assembled to produce the resulting software application, based on a user selection, using predefined natural language words associated to the modules in metadata. The user can choose processes from a list of terms that is presented and controlled by the system, linked to available modules. The user can also implement functions that are not initially available in the list, but that are defined as a combination of existing modules and can be added to the list of terms.

The present invention, unlike US2012/0210296, does not use pre-built process functions. It allows the use of free natural language, from which it builds the functionality by creating models that are instantiable as software applications, not just for BPM solutions, but also for all kinds of solutions that can be described with natural language. This invention does not imply a method for compilable code generation, nor does it limit results to a finite list of features. US2012/0210296 does not operate from the structure of language; rather, it uses language to facilitate user selection of technical components of functional programs.

In line with what is mentioned above, and despite existing prior art that involves automatic development activities, there is still the need of involving development life cycle experts, particularly for error debugging. In this way, the present invention substitutes the programming process with a machine that produces software automatically, based on the design of classes and screens that represent a software-type application case to be written, given as process input. This invention solves the main aspects of the industry problem as follows:

It allows the creation of software applications without performing typical industry tasks, such as building a database, programming compilable code, and making a specific architecture; all of which are currently performed either manually or automatically by those tools that generate program code from specifications. This invention produces results automatically without generating program code, from functional and visual models stored in a database memory, obtained by applying the protocols of this invention to the class and screen designs provided as input by the user.

It reduces the high cost in terms of time and money, technical obsolescence, demand shortage, and allows the product to evolve flexibly and conveniently.

Prior art reports inventions that are interpreters. In the software industry, interpreters are different from compilers or assemblers in that the latter translate a program from its description in a programming language to the system's machine code, whereas interpreters only translate when necessary, typically instruction by instruction and normally without storing the result of such translation as code. The present invention is a model instantiator because it does not solve software from realtime compilation of individual program instructions. In this invention there is no need to program instructions because they are substituted by models stored in a database, which, when called upon by a model instantiator engine, create in memory the functions represented by these models through the execution of various program instructions compiled as part of the engine. Program flow is under the user's control, as well as the recurrent invoking of models with others, which happens based on the instructions compiled into the engine.

Since this invention's model instantiator engine is not limited to solving any case in particular, it is able to instantiate any function from any set of related models. Modifying such function is done by adding or removing models from the data base, without need of modifying any compiled program. This is easier and faster than creating new programs for new functions and it does not require program testing. When using interpreters or compilers to solve functionality, it is necessary to test the program, with the impact this activity has on each iteration, until producing quality software.

4. GLOSSARY

In order to ease understanding of concepts disclosed in this patent application, following is a list a terms indicating the scope of some of such concepts used in the present invention.

Final User: The actor who will ultimately use the solution through the provided user interface.

User's Interface: The medium through which the user can communicate with a machine, a device or a computer. It encompasses all the contact points between the user and the system.

Software Application: It is composed by two parts: The group of concept models that describe business and determine the solution's functional behavior rules, and the group of display models that enable such functionality to materialize in the user's interface, with which the user will interact.

Programming: Computer programming should be understood as the process of coding, debugging and maintaining computer program source code. Source code is written in a programming language. The purpose of programming is to create programs that exhibit a desired behaviour. The process of writing code usually requires knowledge in different areas, besides proficiency on the language to be used, specialized algorithms and formal logic. Programming does not necessarily involve other tasks such as application analysis and design (although it does involve code design), even if these tasks are usually fused together in the development of small applications.

Object-Oriented Programming (OOP) Paradigm: It is currently the most used programming paradigm. Its central core is the combination of data and processing in a single entity called "object", consequently associated with other "object" entities. Traditionally, data and processing have been classified in areas apart from design and software implementation. This made big developments to have issues in terms of reliability, maintenance, change adaptation and scalability. With object orientation and features such as encapsulation, polymorphism or inheritance, a significant advancement was achieved in terms of software development in any production scale.

Metaclasses: In the OOP paradigm, a metaclass is a class whose instances are classes. This concept is applied to the functional specification protocol in this invention with some particularities.

Program Code: It is the group of instructions and data to be processed by a computer, written in a language the computer can interpret and execute. Computing code can be binary or source code written in a superior level language.

Procedural Language: It is the name of program code generated in structured programming format. This format is based on structuring program code in components that receive the name of procedures, sub-routines or functions.

Interpreter: In computer science, an interpreter is a computing program able to analyse and execute other programs. Interpreters are different from compilers or assemblers because while the latter translate a program from its description in a programming language to the system's machine code, interpreters just translate when necessary, typically, instruction by instruction, and normally they do not store such translation.

Compiler: A compiler is a computing program that translates a program written in a programming language to machine language. This translation process is known as compilation.

System: In the present invention it should be understood as the group of electronic or optoelectronic elements that interact among each other to expose in a visual device software applications based on design specifications.

UI Component: They are code portions (HTML or other) that are used to give visual form to the presentation of information on a screen-type or similar device. These components are known as third party component sets and are used in the software industry as complements in software application development.

5. BRIEF DESCRIPTION OF THE INVENTION

This invention discloses a system and method that, based on the input of logical information structures into an electronic device comprising memory and processor, automatically produces outputs in visual devices. These can be operated to create of businesses process information, substituting software applications that are normally developed through traditional programming as known in the software industry.

The method used by the computer interprets and displays software-type applications based on design specification which includes these stages:
a. Load, through an Input/Output Device 120, the functional specification protocol (PEF), the visual specification protocol (PEV) and the UI resources and store them in the database memory 130;
b. Identify, validate against the stage a's protocols and store the functional design components and the visual design components based on the software design specifications in the database memory 140;
c. Automatically create functional models and visual models based on the functional and visual design components from stage b and store such models in the database memory 130, Models MF 135 and Models MV 134 logical structures respectively; and
d. Read, instantiate and expose automatically, on the Input/Output device 120, Application Interface 123, through processor 150, configured as model instatiator 153, functional and visual models created in stage c, combined with UI resources, following the norms of the protocols stored in stage A.

Additionally, this invention comprises a system that instanciates and exposes operational software applications based on software design specifications that include:
a. An input/output device 120 configured as CDF interface 121, CDV interface 122, Application Interface 123 to input the software design specifications and present the resulting software applications.
b. A central processing unit (CPU) 110 connected to an input/output device 120 containing:
A general memory 140 that is paired with the input/output device 120, which interacts with processor 150, configured to store visual, functional and UI components in a volatile way; and
A processor 150 configured to receive at least one software design specification through the Input/Output device 120; such processor is configured as model validator 151 to validate software specification against the protocols of stage A, and to identify the resulting software-type application, integrating the functional and visual models, as well as the UI resources, and,
such processor configured as model instantiator 153 to display the resulting software-type application in the Application's Interface 123;
and
c. a database memory 130 connected to CPU 110, paired with processor 150, configured to statically store the protocol of specification Visual PEV into a logical structure PEV 131, the protocol of functional specification PEF into a logical structure PEF 132 and the UI resources into a logical structure of UI Resources 133 and also configured to dynamically store visual models into a logical structure Models MV 134, functional models into a logical structure Models MF 135 and objects into a logical structure Objects 136.

6. BRIEF DESCRIPTION OF THE FIGURES

Figure 1A:
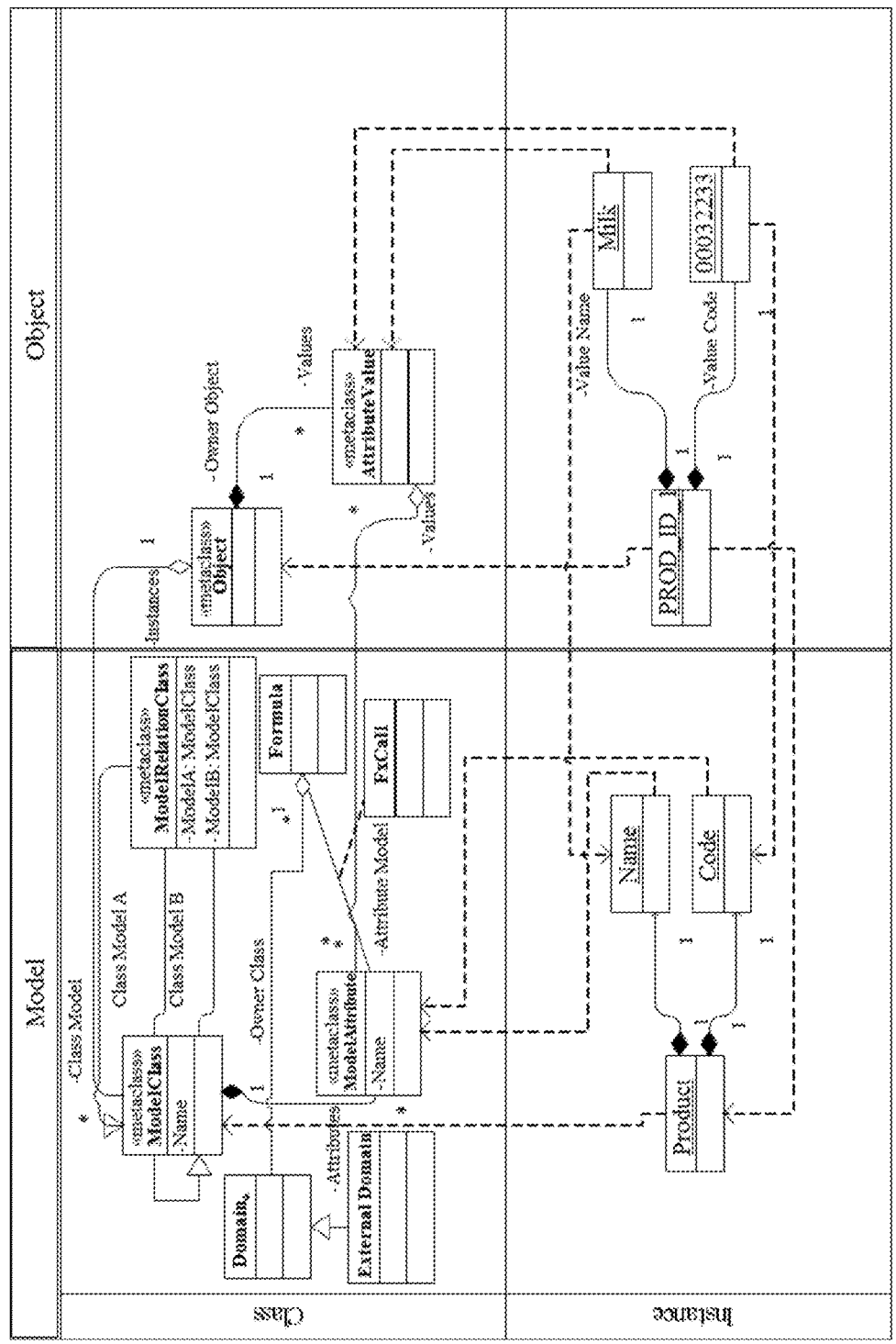
Figure 1B:
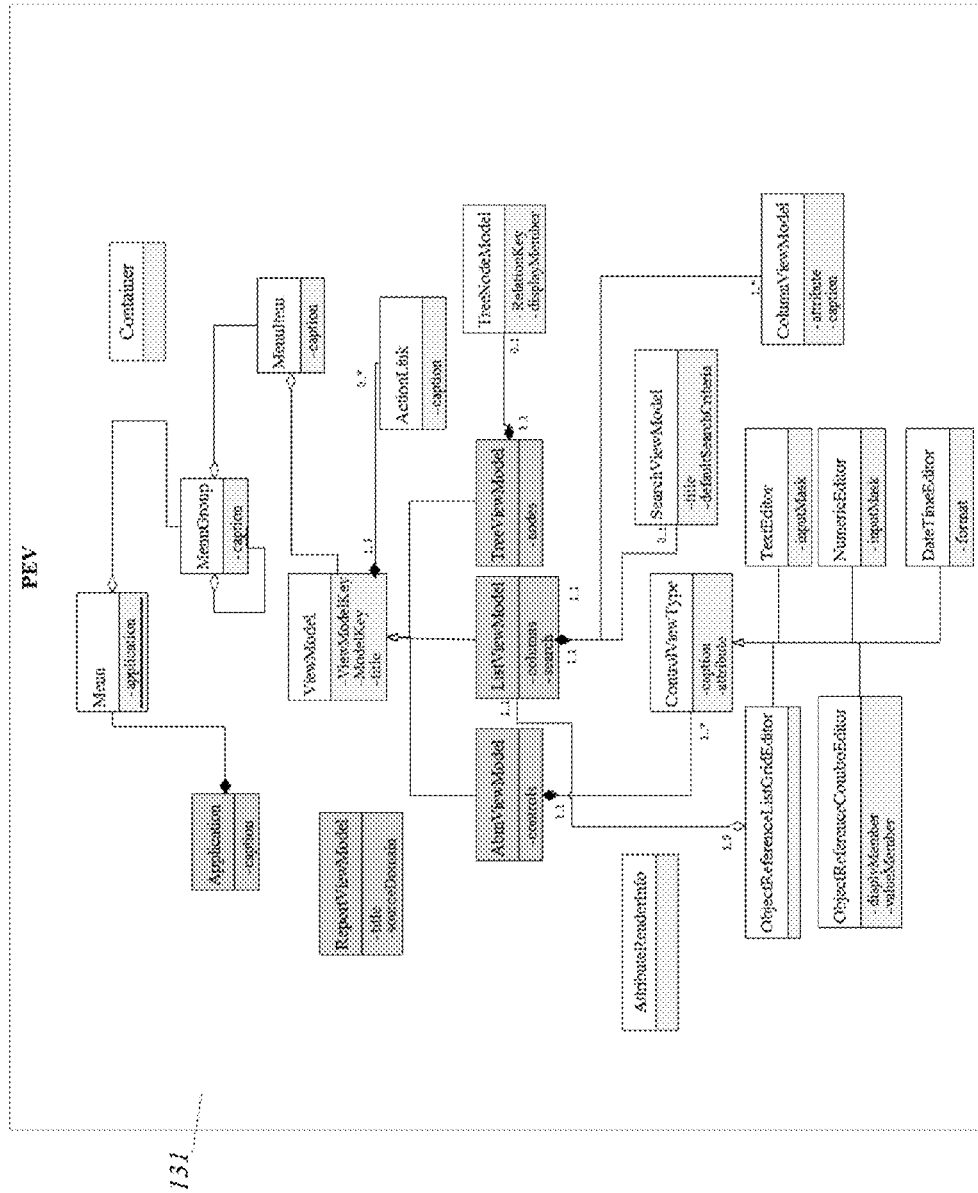
Figure 1C:
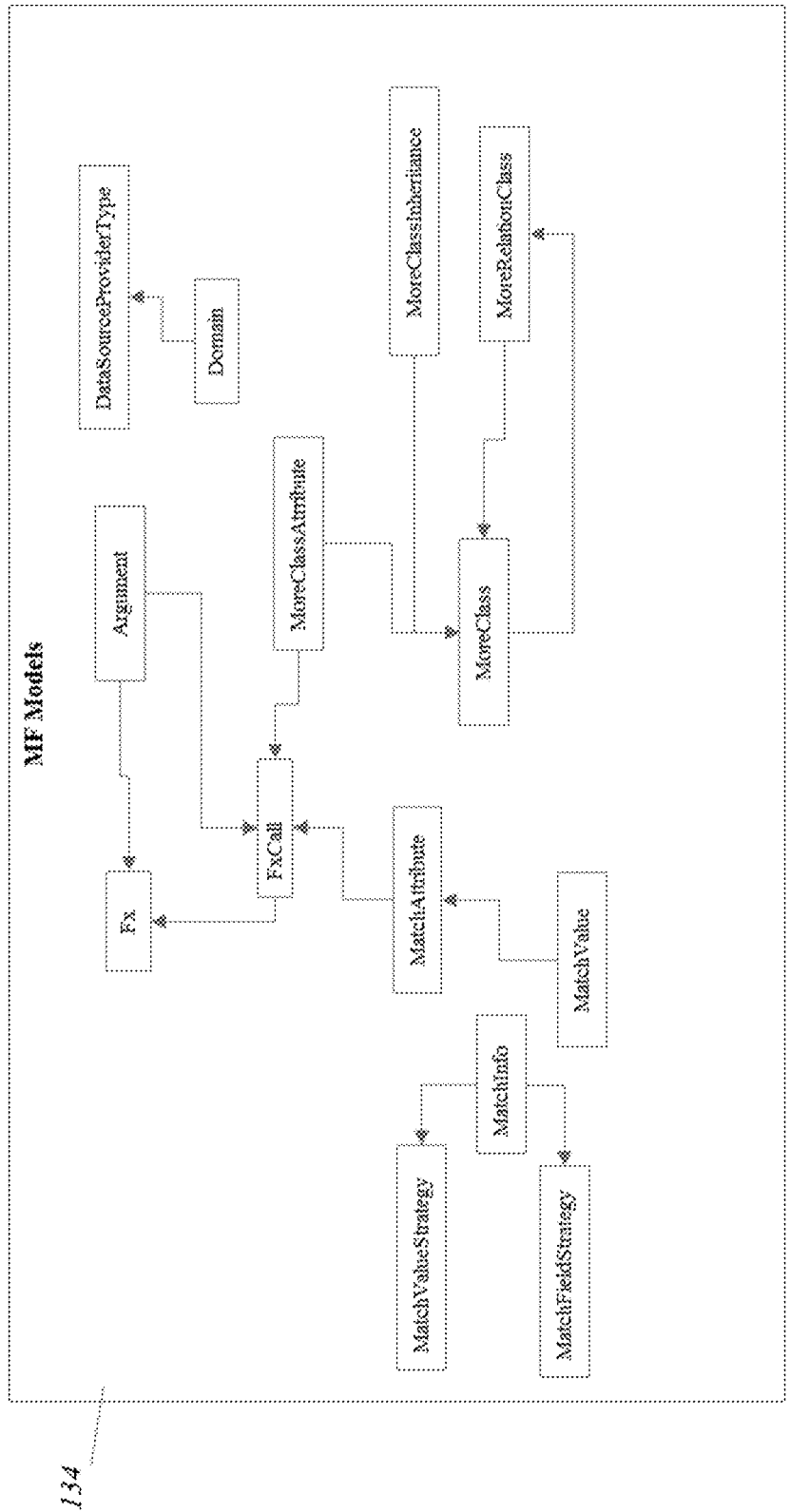
Figure 1D:
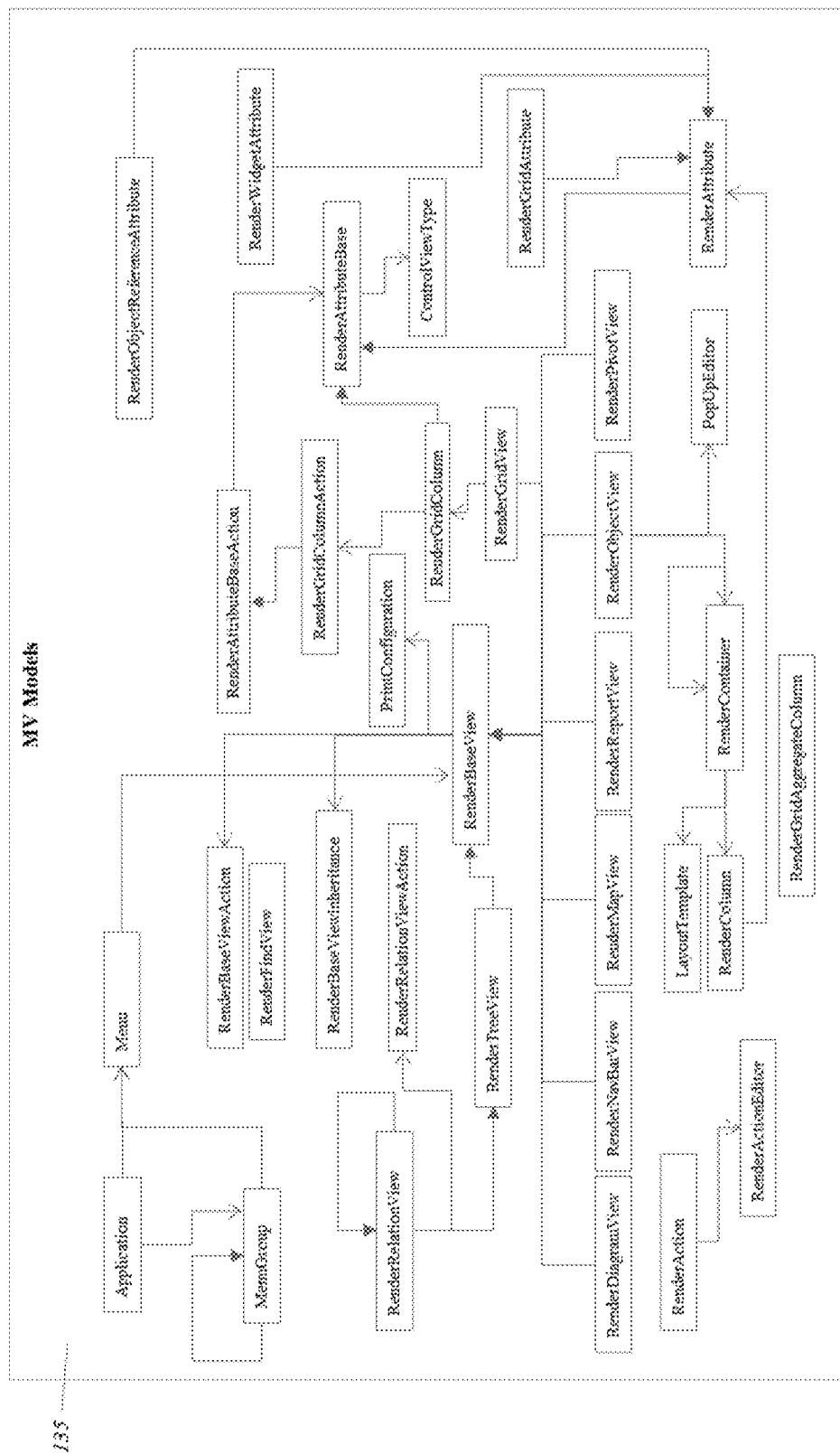
Figure 1E:
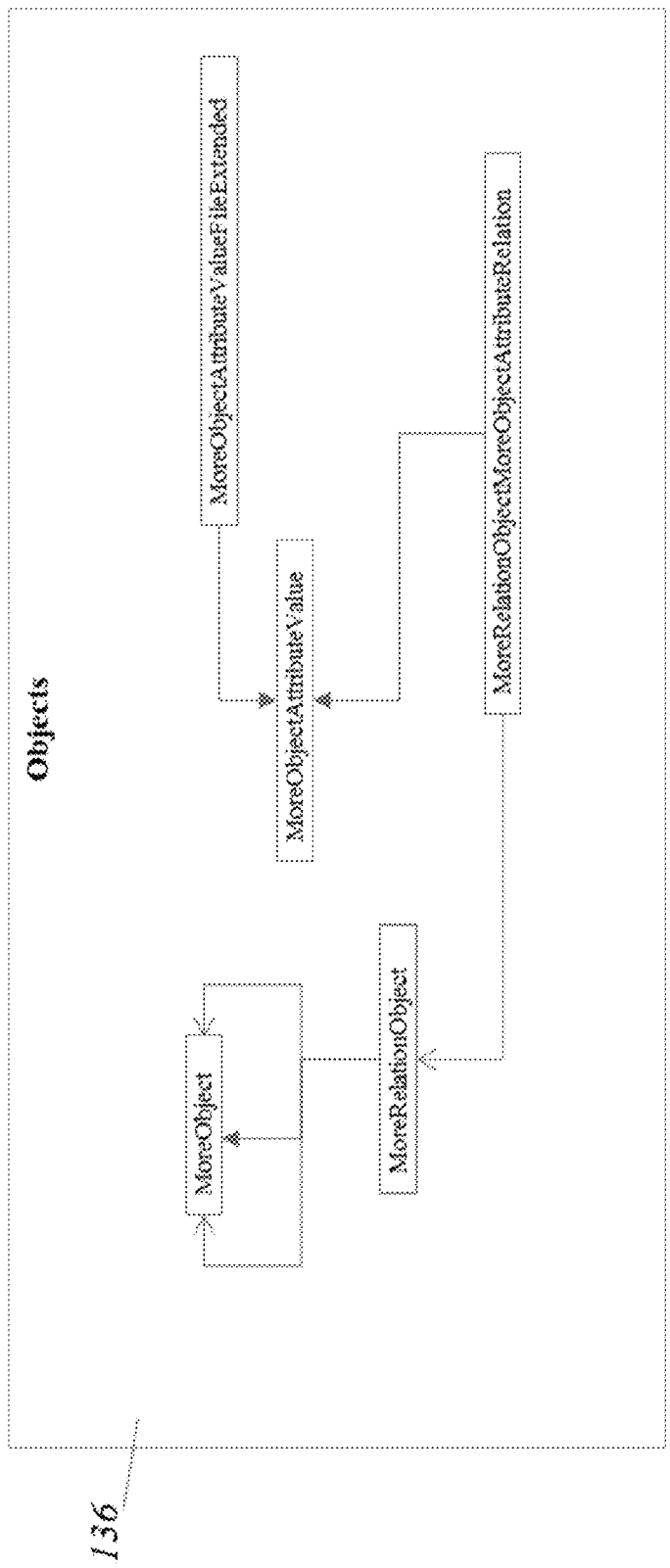

FIG. 1. Shows the structure of this invention's system.
FIG. 1A. Shows the functional specification PEF protocol.
FIG. 1B. Shows the visual specification PEV protocol.
FIG. 1C. Shows the logical structure of the database memory of Models MF.
FIG. 1D. Shows the logical structure of the database memory of Models MV.
FIG. 1E. Shows the logical structure of the database memory of Objects.
FIG. 2. Shows the stages of this invention's method.
FIG. 2A. Shows in detail the sub-stages of Stage A.
FIG. 2B. Shows in detail the sub-stages of Stage B.

FIG. 2B1. Shows an example of functional component and OO type identification.

FIG. 2C. Shows in detail the sub-stages of Stage C.

FIG. 2C1. Shows an example of the application of protocol PEF in a classes diagram.

FIG. 2C2. Shows an example of the application of protocol PEV in a screen diagram.

Figure 2D:
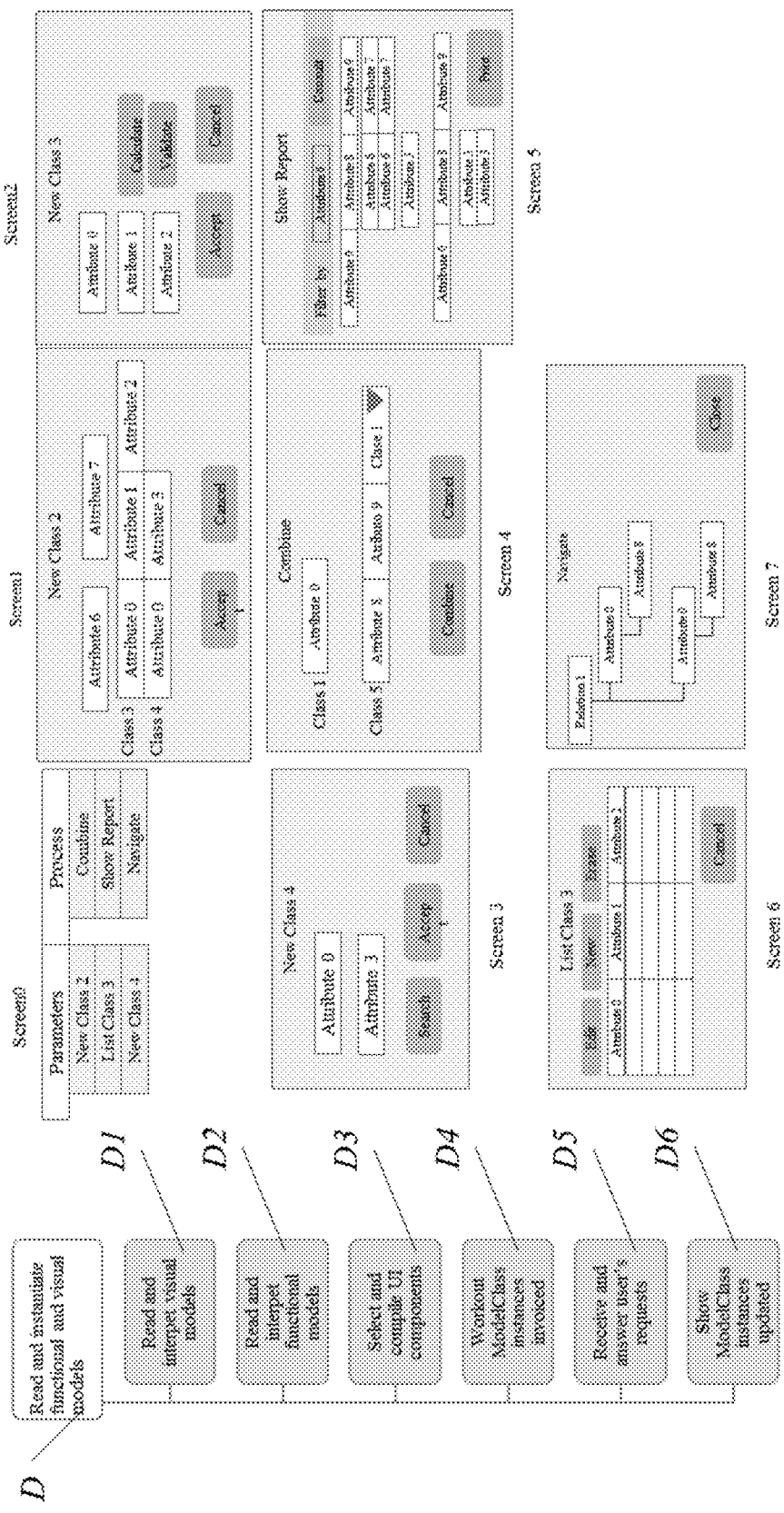

FIG. 2D. Shows in detail the sub-stages of Stage D.

Figure 3A:
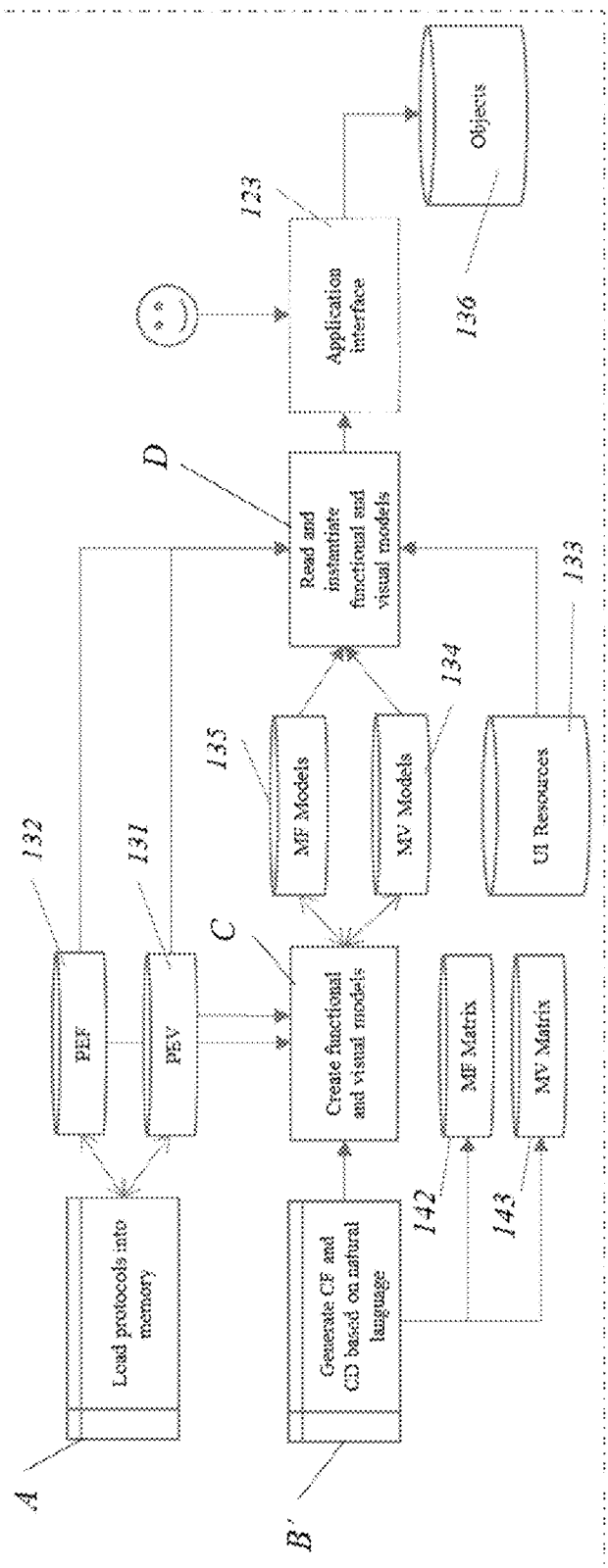

FIG. 3A. Shows an additional mode of the stages of this invention's method.

Figure 3B:
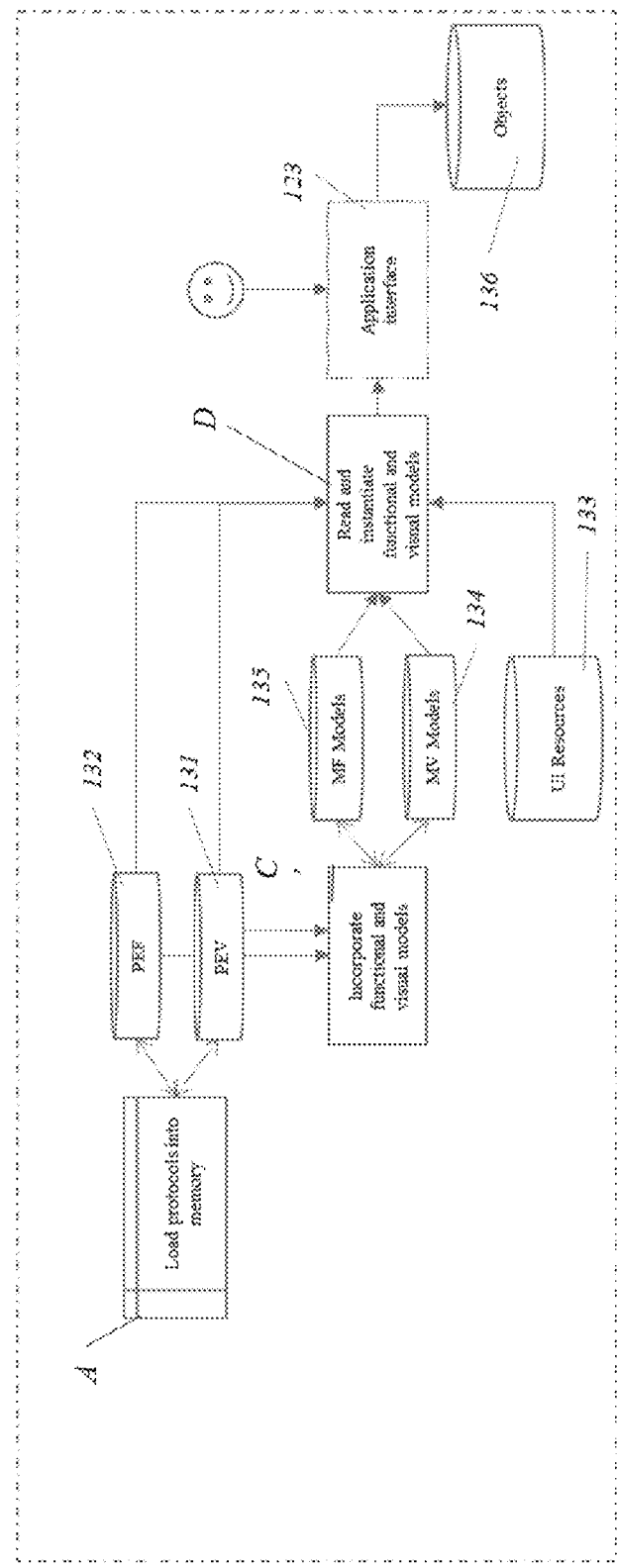

FIG. 3B. Shows an additional mode of the stages of this invention's method.

7. DETAILED DESCRIPTION OF THE INVENTION

This invention is a system and computer applied method that allows storing class models, which represent the detailed design of a software application, in a database memory, and expose the resulting software-type applications by instancing such models. As described in FIG. 2, the process starts by storing software designs in the database memory, then identifying the components of such design, using the protocol definitions previously stored in the system to solve model instantiation, which finally constitute the software-type application. In this invention, a model represents a functional or visual design component, materialized in a database memory.

In order to run this method, a system like the one described in FIG. 1 is used to enter the class designs and screens in an Input/Output device 120. The entered designs are transferred to the general memory and then processed by Processor 150. This processor is configured to validate, combine and instantiate the existing models in the Database Memories 134 and 135. The results of each processing function are displayed in the screens of the Input/Output device 120.

The components of system 100 FIG. 1 are described as follows:

1. Input/Output device 120: This is the device by which software designs are entered. It allows a processor to display on visual media (screens, projectors, TV sets, printers, monitors, mobile devices, among others) the structures where the user can enter the class and screen designs (like the ones displayed in FIG. 2B), and see the resulting software-type applications by means of the following configurations:
    a. CDF Interface 121: It is a visual structure that allows the user to enter the functional design components of a software application based on a class diagram, which are stored in the Database Memory 130, in the logical configuration of Models MF 135.
    b. CDV Interface 122: It is a visual structure that allows the user to load the visual design components of a software application based on a screen diagram associated to a class diagram, which will be stored in the Database Memory 130, in the logical configuration of Models MV 134.
    c. Application Interface 123: This interface shows the user the visual structures of the resulting software application once Processor 150 has instanciated the functional and visual models available in Database Memory 130.
2. CPU 110: It is the device that processes system 100. This device is structured to validate functional and visual models against the corresponding protocol, combine UI resources and instanciate the software-type application based on the previous steps. It comprises the general memory that permits the exchange between functions and the other components of the system.
    a. General Memory 140: It is a volatile storage system used as a means of exchange device between the database memory, the processor and the input/output device. It performs the following functions depending on its configuration:
        i. MF Matrix 142: It is the configuration of the General Memory which enables the processing of the Functional Models residing in the Database Memory 135 through Processor 150 configured as model instantiator 153, aligned with the protocols stored in the database memories 131 and 132.
        ii. MV 143 Matrix: It is the configuration of the General Memory enables the processing of Visual Models residing in the Database Memory 134 through Processor 150 configured as model instantiator 153, aligned with the protocols stored in the database memories 131 and 132.
    b. Processor 150: It is the device where al the processing and exchange tasks are carried out. It performs the following functions depending on its configuration:
        i. Model Validator 151: It is the Processor's configuration mainly in charge of validating functional models entered by the user against the protocols residing in the database memories 131 and 132, and once validated, storing in database memories 134 and 135 respectively.
        ii. UI Combiner 152: It is the configuration of the Processor mainly in charge of combining UI resources residing the database memory 133 with the visual models stored in database memory 130, before the instantiation process.
        iii. Model Instantiator 153: It is the configuration of the Processor mainly in charge of instantiating the functional and visual models already combined with the UI resources residing in the logical configurations of general memory 142 and 143 in order to automatically expose the resulting software-type application in the Application's Interface 123.
3. Database Memory 130: It is a permanent memory that stores the data entered by the user and generated by Processor 150 in its different configurations. This memory contains two storage configurations, a static configuration and a dynamic one. Static configuration stores necessary data that are entered once for processing, and do not belong to "the case". Dynamic configuration stores data pertaining "the case", which are entered per case.
    a. Static Memory:
        i. PEF 131: Database Memory 130 configuration containing the rules Processor 150 uses to validate and instantiate functional models, defined and entered in this memory based on the Visual Specification Protocol (PEV).
        ii. PEV 132: Database Memory 130 configuration containing the rules Processor 150 uses to validate and instantiate functional models, defined and entered in this memory based on the Visual Specification Protocol (PEV).
        iii. UI Resources 133: Database Memory 130 configuration containing software components that allow Processor 150 display models in the Interface of Application 123 on screens controlled by the user.
    b. Dynamic Memory:
        i. Models MV 134: Database memory 130 configuration containing the functional models entered by the user by means of CDV Interface 122 and validated by Processor 150 against the Visual Specification Protocol (PEV). This memory consists of the following logical structures associated to the concepts of Visual Specification Protocol shown in FIG. 1B:
1. Configurations associated to the concept ActionLink
   a. Logical structure RenderAction
   b. Logical structure RenderActionEditor
   c. Logical structure RenderAttributeBaseAction
   d. Logical structure RenderBaseViewAction
2. Configurations associated to the concept of Application
   a. Logical structure Application
3. Configurations associated to the concept of AttributeRenderInfo
   a. Logical structure RenderAttribute
   b. Logical structure RenderAttributeBase
   c. Logical structure RenderDiagramView
   d. Logical structure RenderMapView
   e. Logical structure RenderNavBarView
   f. Logical structure RenderObjectReferenceAttribute
   g. Logical structure RenderPivotView
   h. Logical structure RenderReportView
   i. Logical structure RenderWidgetAttribute
4. Configurations associated to the concept ColumnViewModel
   a. Logical structure RenderColumn
5. Configurations associated to the concept Container
   a. Logical structure RenderContainer
6. Configurations associated to the concept ListViewModel
   a. Logical structure RenderFindView
   b. Logical structure RenderGridAggregateColumn
   c. Logical structure RenderGridAttribute
   d. Logical structure RenderGridColumn
   e. Logical structure RenderGridColumnAction
   f. Logical structure RenderGridView
7. Configurations associated to the concept Menu
   a. Logical structure Menu
8. Configurations associated to the concept MenuGroup
   a. Logical structure MenuGroup
9. Configurations associated to the concept TreeViewModel
   a. Logical structure RenderRelationView
   b. Logical structure RenderRelationViewAction
   c. Logical structure RenderTreeView
10. Configurations associated to the concept ViewModel
    a. Logical structure PopUpEditor
    b. Logical structure PrintConfiguration
    c. Logical structure RenderBaseView
    d. Logical structure RenderBaseViewInheritance ii. MF Models 135: Database Memory 130 configuration containing the functional models entered by the user by means of Interface CDF 121 validated by Processor 150 against the Functional Specification Protocol (PEF). This memory consists of the following logical structures associated to the Functional Specification Protocol concepts, MoreClass quadrant, as shown in FIG. 1A:
1. Configurations associated to the concept Domain
   a. Logical structure Domain
2. Configurations associated to the concept Formula
   a. Logical structure Fx
   b. Logical structure MatchAttribute
   c. Logical structure MatchFieldStrategy
   d. Logical structure MatchInfo
   e. Logical structure MatchValue
   f. Logical structure MatchValueStrategy
3. Configurations associated to the concept FxCallArgument
   a. Logical structure FxCall
4. Configurations associated to the concept ModelAttribute
   a. Logical structure MoreClassAttribute
5. Configurations associated to the concept ModelClass
   a. Logical structure MoreClass
   b. Logical structure MoreClassInheritance
6. Configurations associated to the concept ModelRelationClass
   a. Logical structure MoreRelationClass iii. Object 136: Database Memory 130 configuration containing the objects the user generates based on the models instanciated through the software-type application, by Processor 150 configured as Model Instantiator 153. This memory consists of the following logical structures associated to the concepts of Functional Specification Protocol, Object-Class quadrant, as shown in FIG. 1A:
1. Configurations associated to the concept AttributeValue
   a. Logical structure MoreObjectAttributeValue
   b. Logical structure MoreObjectAttributeValueFileExtended
   c. Logical structure MoreRelationObjectMoreObjectAttributeRelation
2. Configurations associated to the concept of Object
   a. Logical structure MoreObject
3. Configurations associated to the concept of RelationObject
   a. Logical structure MoreRelationObject This invention includes the system described and a computer applied method that interprets and exposes software-type applications based on design specifications. Referring to FIG. 2, the method of this invention comprises the following stages:

Stage A. Load, through Input/Output device 120 the Functional Specification Protocol (PEF) in logical structure PEF 132 and the Visual Specification Protocol (PEV) with its corresponding UI resources in the logical structures PEV 131 and UI Resources 133 from the Database Memory 130.

Stage B. Based on the class design, identify and store the components of functional design detailed in the class diagram through Interface CDF 121 and store them temporarily in General Memory 140, in the logical structure MF Matrix 142. Based on the screen design, associated to class design, identify and load the visual design components detailed through Interface CDV 122 and store them temporarily in General Memory 140, in the logical structure MV Matrix 143.

Stage C. Validate the functional and visual models created in Stage B, using Processor 150 in its configuration as Model Validator 151 to create, from each model stored in the General Memory 140, a model compatible with protocols PEF and PEV residing in Database Memory 130 stored in Stage A. Store the resulting functional models in Database Memory 130, in its logical configurations Models MF 134 and Models MV 133 respectively.

Stage D. Recover from the Database Memory 130, Functional and Visual Models created in Stage C and UI Resources stored in Stage A and store them in General Memory 140 using Processor 150 configured as UI Combiner 152. Combine UI Resources with the visual and functional components stored in General Memory 140 and instance the compiled models and display the screens of a software-type application on the Input/Output Device 120, Application Interface 123, using Processor 150 configured as Model Instantiator 153. Obtain user requests through Application Interface 123 and add resulting objects from Processor 150's answer to the application's operation, in the Database Memory 140, Objects logical structure 136.

The stages in the process are described in detail as follows:

Stage A. Load Protocols into Memory

In this stage, as FIG. 2A shows, two norms are defined, called protocols, that are loaded into the Database Memory 130 only once. Processor 150 uses these protocols, in its different configurations during all the process: i) Functional Specification Protocol (PEF); and ii) Visual Specification Protocol (PEV).

These protocols establish the mode in which Processor 150 will combine all functional components in a software class design diagram (OO) and a screen design diagram in order to obtain an operational software application automatically.

In this invention, a class diagram with its correspondent screen design diagram is regarded as "the case". The class design diagram represents the software application functionality (made up of a set of functional components) and the screens diagram represents the visual structure (made up of a set of visual components) that displays the software-type application to its users. Both protocols are described as follows:

Substage A1. Load Functional Specification Protocol (PEF)

This protocol is the rule that defines the behavior Processor 150 will assign the user-loaded functional components based on the class design diagram, from now on PEF components, which determine the logical structure for the operation of System 100. The architecture defining the functions of this protocol can be observed in FIG. 1A.

PEF protocol defines the Metaclasses referred to classes whose instances are classes, according to OO. In this protocol, the classes that are instances of a Metaclass are known as Models (Instance-Class quadrant FIG. 1A)

By using PEF protocol, the functionality of the resulting software-type application, is obtained by instantiating the meaning of the implicit language in a class design on one hand, and mathematical logic on the other. In the semantic part of "the case", methods (OO) identified in the class diagram, through the protocol become classes, and in mathematics the methods (OO) that denote mathematical functionality become formulas. In the Functional Specification Protocol PEF, as presented in FIG. 1A quadrant Model-Class, there are three components for solving the semantics (ModelClass, ModelRelationClass, and ModelAttribute) and four components for solving mathematics (Domain, external Domain, Formula and FxCall).

This protocol also defines Object classes (quadrant Object-Class from FIG. 1A). These classes of objects ModelObject and ModelAttributeValue are components that System 100 uses to store instances of models from Instance-Object quadrant.

PEF components are those belonging to quadrants Model-Class and Object-Class. Within quadrant Model-Class, there are: ModelClass, ModelRelationClass, ModelAttribute, Formula, Domain, and FxCall. They are a set of Metaclasses that originate functional Models which are stored in the Database Memory 130, in the logical structure Models MF 135. Within quadrant Object-Class there are: ModelObject and ModelAttribute Value. They are a set of Classes that produce System Objects which are stored in the Database Memory 130, logical structure of Objects 136. Following is a description of PEF components:

i. Metaclasses that Originate Software Application Functional Models (Quadrant Model-Class)

ModelClass

It is a metaclass component because its instances are models. This component models design structures that are classes in the OO design diagram. A ModelClass can result from another ModelClass.

Example: We can create the metaclass Human Entity (ModelClass), another metaclass Person (ModelClass that results from ModelClass Human Entity). Person instances can be physical or legal persons. Both Physical Person and Legal Person are models that constitute instances of Metaclass Person.

ModelRelationClass

It is a metaclass component that inherits from ModelClass. The functionality that extends ModelClass, gives this metaclass the ability to relate two ModelClass, which can be two types: Association or composition, as defined by OO.

For example: if we take ModelClass Physical Person and ModelClass Legal Person, we could think that a Physical Person instance (Juan Perez) could be an employee of Legal Person instance (Google Company). In this case, there is a ModelRelationClass called "is related with" that links ModelClass Person with itself at the level of metamodel. This link could be used to represent the employee relationship between a Physical person and a Legal Person, or it can also specialize ModelClass Person in ModelClass Physical Person and Legal Person in order to then create the specialty ModelRelationClass "is an employee of" that will be inherited from ModelRelationClass "is related with".

ModelAttribute

It is a metaclass component that composes a ModelClass. A ModelClass has a list of ModelAttributes. ModelAttribute is the representation of attributes contained by models created as instances of ModelClass.

A ModelAttribute defines, among other things, the type of attribute data that it is producing.

The protocol defines three types of data for ModelAttribute.

Simple ModelAttribute: Simple types are those whose value instance does not involve ModelObject instances. For example: number datum, text datum, image datum.

ModelAttribute RelationObject: These attributes exist within a ModelClass product of its participation in a ModelRelationClass. This type of attribute, in its value instance and depending on the relationship, can have one or more instances of relationship objects. This determines the cardinality of the relationship. Example: If we have a ModelRelationClass between ModelClass "Person" and ModelClass "Article", there is a ModelAttribute of type RelationObject in ModelClass Person that will have as an instance the persons that are related with Article; and the other way around: ModelClass Person has a RelationObject-type ModelAttribute that will have articles related with Person as instances.

ModelAttribute ObjectReference: This type of data is similar to the previous one, but it does not come as the product of the ModelClass it belongs to participating in a relationship. The attribute itself is that which knows the nature of the objects that will timely compose the instance of value for itself. Example: When creating a ModelAttribute as part of a ModelClass it is declared ObjectReference Formula A formula is an independent model that has an expression and a set of parameters to receive information from the Model that invokes it. The formula, when executed, will always return a value to the Model invoking it. The resulting value can be a single instance or multiple instances as part of arrays or multidimensional arrays.

The functional specification protocol defines the formula component used to solve such logic that functionally requires the execution of mathematical operations that use model instances as arguments. The formula provides all math operators for algebraic, matrix and set operations and it allows to define the expression using existing arguments as instances of the models from Model-Instance quadrant from FIG. 1A. The functionality that implies a mathematical resolution is implemented using a Metaclass Formula, unlike traditional software design in which this type of functions are implemented as a method in a class from the OO model. For example: a formula that calculates the total value of a sales transaction, has an algebraic expression that adds up the units sold and returns a single value in a ModelAttribute instance, where the units sold are a collection of ModelAttribute instances.

Domain

Domain is a component that declares the conditions that allow selecting a subset of model instances (operations among sets). A model instance can be found in the Database Memory 130, in the Object logical structure 136, already validated and structured by Processor 150 based on PEF protocol, or in an external memory not structured according to the protocol. Consequently, Domains are classified as follows:

Internal Domains

These domains are solved upon the Database Memory 130, in the Object 136 logical structure obtaining collections of instances that can be processed by other models through formulas. For example: If there is a ModelClass Client, to retrieve its instances stored in the database an Internal Domain must be used, invoked only with the ModelClass name and any conditions that the instances to be retrieved should meet.

External Domains

These are domains that are solved upon a memory NOT structured according to PEF protocol (data in external files). In these cases, the external domain component has access to the object instances and Processor 150 structures them based on the protocol so they make part of the space accessible by internal domains. For Example, if there is an external file that has three columns with data: name, age, and company, in order to recover them an external domain has to be created specifying that such fields belong to a client and the match between columns with the corresponding ModelAtribute (Name column: ModelAttribute Name, age column: ModelAttribute age, company column: ModelAttribute Company). ModelAttribute company is the type of RelationObject where Client is related with the company.

FxCall

This component is responsible for associating any ModelAttribute instance with Formula instances, when the value of ModelAttribute instance comes from a Formula. It is a model that solves an evaluation of the formula expression and returns a result to the model that invokes it, sending mathematical operators and the arguments to be processed to Processor 150. FxCall updates the values of instances' arguments, so the formula invoked requests resolution from Processor 150.

ii. Classes that Originate Software Application Objects (Quadrant Object-Class)

ModelObject

Instances of classes instanciated from ModelClass, are known as ModelObjects. ModelObject is a concrete class that materializes the instances of the objects modelled with ModelClass. For example: Model Article, which is a ModelClass instance has in turn a concrete instance ModelObject "milk". This object is at the same time the materialization of a ModelObject instance.

ModelAttributeValue

The instances of the models modelled with ModelAttribute are known as ModelAttributeValues. ModelAttributeValue is the concrete class whose instances represent the value of a ModelObject Instance. For example: ModelObject "milk", whose ModelAttributeValue for ModelAttribute name is "milk".

Substage A2. Load Visual Specification Protocol (PEV)

This protocol defines, as shown in FIG. 1B, the behaviour that Processor 150 will give to the visual components the user loads based on a screen design diagram, from now on PEV components. These components will determine the visual structure that will be displayed in Input/Output Device 120, Application Interface 123 to operate System 100. The architecture that defines the visual presentation of this Protocol is shown in FIG. 1B.

Visual Specification Protocol PEV defines the way in which PEF and PEV components are related. A PEV component displays the functionality of one or more PEF components through the Input/Output Device 120, Application Interface 123.

This protocol's definition determines that it is possible to generate displays on visual devices that can be operated to produce business process information without making a design of layer architecture particular to each case, because the architecture is embedded within PEF components.

In another embodiment of this invention, PEV components, not related to PEF components, are created. For example: a visual model that contains a website link. PEV components are: Application, ActionLink, AbmViewModel, ListViewModel, TreeViewModel, ReportViewModel.

Application

Application component visually structures a software application. The protocol defines Application component as a Model to specify an application. An application defines Menu as the most important aspect which will enable the user to access to the functionality presented. A Menu is a collection of MenuGroup models and MenuItem models in a tree, where MenuGroups can contain at the same time other MenuGroup or MenuItem. MenuItem is what links the action to be taken when the user clicks on it. An item is associated with any of the following visualisation models (ViwModel): AbmViewModel, ListViewModel, TreeViewModel. When the user executes a MenuItem, Processor 150 of System 100 receives such request through Application Interface 123 and returns a structure in the same Interface that enables the user to execute the function of component PEF invoked by the PEV component associated to MenuItem.

ViewModel

ViewModel component helps expose ModelObject instances on visual devices. A ViewModel component is made up of ActionLink components that enable the ViewModel to execute actions according with the ModelClass model from which it is an instance and the class of ViewModel to which it refers.

A PEV component defines a layout (template or visual layout structure) that will be displayed on the Input/Output Device 120, Application Interface 123, based on ViewModel and its characteristics.

To display model instances, there are three classes of ViewModel: AbmViewModel, ListViewModel and TreeViewModel with different characteristics and layout settings.

(1) AbmView Model

The protocol defines AbmViewModel component as a Method to specify the rendering of a screen that allows creating, deleting or updating a ModelObject Model. The screen rendering displays all or some of the ModelAttributeValues of a Modelobject instance according to the correspondent ModelClass model.

The AbmViewModel is made up of ActionLink components because it is a ViewModel and it extends its functionality through ControlViewType components and the special characteristics of AbmViewModel.

The ControlViewType components expose ModelAttributeValues according to the type of attribute data. Here it is a list of types of attributes for an embodiment of the invention:

TextEditor: Exposes text type ModelAttributeValues.

NumericEditor: Exposes numeric type ModelAttributeValues.

DateTimeEditor: Exposes date type ModelAttributeValues.

ObjectReferenceComboEditor: Exposes ModelObjects selector type ModelAttributeValues.

ObjectReferenceListEditor: Exposes ModelObjects selector type ModelAttributeValues.

The ActionLink components that constitute AbmViewModel are:

Save: Save ModelObject instance inside the transaction database.

Cancel: Closes the visual structure displayed by AbmViewModel and discards changes done by the user in the instance of modelObject.

Save and New: Saves ModelObject instances and creates a new instance so the user fills values of attributes, presenting it on the visual structure of AbmViewModel.

Print: Prints attribute values from the instance that is being modified.

In some embodiment of the invention there are added actions that invoke other ViewModels.

Special characteristics of an AbmViewModel:

AttributeRenderInfo: This model is used to denote the rendering particularities of a control that represents the value of certain instance attribute of ModelObject.

ControlTemplate: Control selector to render a ModelAttribute. Depending on the attribute data type, this could be represented in a variety of ways according to the nature of the type. ControlTemplate is the concept that allows indication of with which of all the possible options will the attribute effectively render.

Container: Within AbmViewModel, there is a structure of containers in order to manage the control layout within the visual device. Each of the components that visually display an attribute is known as a control. This structure of containers is in the form of a tree, in other words, a container can include others.

ColumnViewModel: Within containers, controls are set under columns and these have an internal order for the controls they contain.

(2) ListViewModel

The protocol defines ListViewModel component as a Model to specify the rendering of a screen that lists collections of ModelObject instances. The rendering of this screen presents ModelAttributeValues that such ModelObject has according to the ModelClass model of which it is an instance, for a collection of ModelObject instances that are shown in a table in which each ModelAttributeValue is fitted in a cell, where the row corresponds to the instance and column to the ModelAttribute.

ListViewModel component is made up of ActionLink components as it is a ViewModel and extends its functionality through the components SearchViewModel, ColumnViewModel, ObjectReferenceListGridEditor and the special characteristics of ListViewModel.

The ActionLink components that conform ListViewModel are: New; Cut; Edit; Print; Execute Formula.

Additionally, for RelationObject lists the following actions arise:

NewMTarget: Invokes the creation of a new ModelObject of the model designated as relationship target.

NewMTarget&Associate: Invokes the creation of a new ModelObject of the model designated as relationship target and materializes the relationship with the ModelObject owner of the relationship's attribute.

DeleteMTarget: in an instance of the relationship, it eliminates the ModelObject related, as well as the relationship's instance.

EditMtarget: Invokes the edit screen of the related ModelObject.

Especial characteristics of a ListViewModel:

Hierarchical view: it refers to the hierarchical structure representation of the graph of objects related by means of ModelRelationClass models.

InLine Edition: Support for modifying the attributes of an object in the same line of the list.

(1) TreeViewModel

The protocol defines the TreeViewModel component as a Model to specify the rendering of a ModelObjects tree related by means of RelationObjects. The rendering of this screen is basically the exposition of all or some of the ModelAttributeValues that such RelationObjects invoke from the ModelClass that it relates.

A tree node, represented in a TreeNodeModel component, represents an instance of ModelObject and an instance of RelationObject, which is the existing relationship between the node in question and its parent. Thus, the first level nodes in the tree will not be represented by any instance of the RelationObject, as they are not related to any parent node.

The TreeViewModel component is made up of Action-Link components since it is a ViewModel and extends its functionality through the special characteristics of a TreeViewModel.

The ActionLink components that conform a TreeViewModel are:

New: It creates a new RelationObject instance based on the corresponding ModelRelationClass according to the tree's display model for the node where the action is being invoked.

Delete: It eliminates the RelationObject instance that links the current node with its parent node.

Edit: It edits the RelationObject instance that links the current node with its parent node.

NewMTarget: It invokes the creation of a new ModelObject instance that corresponds to the relationship's target for the corresponding ModelRelationClass model according to the tree's display model for the node where the action is being invoked.

NewMTarget&Associate: same as NewMTarget, added that it then creates the RelationObject instance to link the new ModelObject with the ModelObject represented by the node where the action was invoked.

EliminateMTarget: It eliminates the ModelObject instance represented by the current node.

EditMtarget: Edits the ModelObject instance represented by the current node.

Special characteristics of a TreeViewModel:

LoadOnDemand: It indicates if the tree should discover and load its nodes while the user interacts expanding the tree.

ShowExpanded: It indicates that, when visualising the tree, it should be displayed with all its expanded nodes.

EditOnClick: It indicates that the edition of an object represented by a node should be invoked when the user clicks on it.

(4) ActionLink

ActionLink components define the actions that are available in the ViewModel to execute upon the instances of ModelObject.

Each ViewModel subclass has a different list of ActionLinks in regards to the function exposed on the visual device.

(5) ReportViewModel

A ReportViewModel contains the necessary specification so that Processor 150, configured as Model Instantiator 153, can interact with any report delivery service, like for example Reporting Services.

This is possible since the ModelObject instance repository is compatible with the query methods these services implement, in such way that making use of the display components that come with these technologies it is possible to generate and embed reports easily and with all the necessary reporting features.

Substage A3. Load UI Sources

Visual Specification Protocol PEV is designed in such way that processor 150 can combine visual components with UI sources. The purpose of this combination is that the Processor can quickly make these components available to model the User interface. This is possible through the concept of ControlViewType of the PEV protocol loaded in Substage A2, which is directly linked with a UI source and from a ViewModel, it indicates which UI source will represent a certain portion of the user interface on the Input/Output device, Application Interface 123.

UI sources are partial portions declared in any UI language (for example HTML5) and whose appearance can be adjusted with cascading style sheets (css). These resources are stored in the Database Memory 130, logical structure UI resources 133. Then, when Processor 150, set as UI Combiner 152 performs its functions, it links these UI Resources with an instance of the logical structure ControlViewType, residing in the Database Memory 130, logical structure Models MV 134, leaving these fused models available to be used in the presentation of the software-type application.

Stage B. Identify and Store Design Components

Design is described because it is important as an input into the process encompassed by this invention.

Design documents, as shown in FIG. 2B, particularly refer to two types of known diagrams to define the functionality and the visual structures that define a software-type application:

Class diagrams (220) that represent functional design. These designs will be use in the creation of functional models.

The screen diagrams (221) that represent visual design required. These designs will be used to create visual models.

As of this stage of functional and screen design, the following substages take place:

Substage B1. Identify Functional Design Components

Based on the class design (220) that represents the logic to be solved, list the classes present in the diagram. Based on the class diagram identify their components taking into account that the type of component is defined according to OO paradigm and make it correspond to a ModelClass component, according to what is established by PEF protocol loaded in Substage A1. Identify the name of each component identified as it is shown in the Example in FIG. 2B1, and determine the corresponding PEF component just as it can be observed in the Example in FIG. 2C1, like this:

If the diagram presents a class, identify a functional component type OO Class and determine that a PEF ModelClass component corresponds to it.

If the diagram presents an attribute within a class, identify a functional component type OO Attribute and determine that a PEF ModelAttribute corresponds to it.

If the diagram presents a relationship, identify a functional component type OO Relationship, and determine that a PEF ModelRelationClass corresponds to it.

If the diagram presents a method within a class, identify a functional component type OO Method and determine:

If the method refers to an algebraic mathematical calculation, it corresponds to a PEF Formula component.

If the method refers to a mathematical function equivalent to set theory, it corresponds to a PEF Domain component, which could be external in case it refers to data external to the system.

If the diagram exposes inheritance, identify the functional component type OO Inheritance and determine that an inheritance relationship between two ModelClasses corresponds to it as defined by PEF protocol in quadrant ModelClass.

The user, through Input/Output Device 120, CD Interface 121 loads PEF components identified and Processor 150, configured as Model Validator 151, stores them in General Memory 140, logical structure MF Matrix 142.

Substage B2. Identify Visual Design Components

Taking as reference the screen design which represents the way in which one wishes to see and interact with the software-type application that will be automatically built by Processor 150 configured as Model Instantiator 153, the steps to be executed to determine the visual models that should be created to expose the software-type application for "the case" are described as follows.

Based on the PEF components list, the Visual Specification protocol is loaded in Stage A to identify the ModelClass type concepts and create the visual models that define protocol PEV (Application, AbmViewModel, ListViewModel, TreeViewModel), like this:
  a. For each ModelClass, the following ViewModel should be created: AbmViewModel, ListViewModel.
  b. For each modelRelationClass, the following ViewModel should be created: ListViewModel, TreeViewModel.
  c. To display all the PEF components, the following should be created: Application Model, MenuViewModel model, MenuGroup model and an ItemGroup model for each ViewModel created in the previous steps.

In another embodiment of this invention, system 100 allows to edit visual models created to achieve the closest similarity possible with the screen designs corresponding to "the case" available as process input.

The user, through Input/Output device 120, Interface CDV 122, loads the PEF components identified and Processor 150, configure as Model Validator 151, stores them in General Memory 140, logical structure MV Matrix 143.

Stage B'. Generate CF and CD from Natural Language.

In an embodiment of this invention, Stage B' substitutes Stage B, as shown in FIG. 3A.

In this stage, the user generates CF and CD from natural language. For example, using as it is described in patent application Ser. No. 15/141,748, entitled "PROCESS AND SYSTEM FOR AUTOMATIC GENERATION OF FUNCTIONAL ARCHITECTURE DOCUMENTS AND SOFTWARE DESIGN AND ANALYSIS SPECIFICATION DOCUMENTS FROM NATURAL LANGUAGE", filed as reference in its entirety.

In this embodiment, the next substages follow:

Substage B'1. Obtain Functional Components

Processor 150 connects to Database Memory, logical structure 172 identified in patent application Ser. No. 15/141,748, obtains the functional components from "the case" and stores them in MF Matrix 142.

Substage B'2 Identify Visual Components

Processor 150 runs through the list of functional components obtained during Substage B'1 and applies Visual Specification Protocol PEF defined in Substage A2. It obtains one or more visual components from each functional component, as it is shown in FIG. 2C2, and stores them in the MV Matrix 143.

Stage C. Create Functional and Visual Models

In this stage, Processor 150 extracts the PEF components created in Substage B1 from General Memory 140, logical structure MF Matrix 142, and the next substages follow:

Substage C1. Identify PEF Components and Create Functional Models

In this substage, as it is shown in FIG. 2C, Processor 150 identifies the PEF components available in General Memory 140, created in Substage B1, and specifies PEF components according to the protocol loaded in Substage A1. Then, it creates the Functional Models, which specify the functions that Processor 150 will use to instantiate the software-type application for "the case". Processor 150 follows these steps:
  1. Runs through the list to identify what PEF Concept has to be created based on the Specification Protocol for each OO Type of the design components, as it was determined in Substage B1.
  2. For those design components whose PEF Concept associated is a formula, it creates the following additional PEF components:
    a. It creates a PEF component FxCall type and links it to the ModelAttribute that uses the Formula within the same Class.
    b. If the formula logic implies the use of attributes that do not belong to the design component owner of the method, it creates a PEF concept Domain type to locate the data that will act as arguments of the Formula.

Processor 150 stores the Functional Models stored in the Database Memory 130, logical structure Models MF 135.

The conversion of the classes design input of the process, when applying the functional specification protocol PEF, derives in the set of models that are then interpreted by Processor 150, configured as Model Instantiator. 153

Substage C2. Identify PEF Components and Create Visual Models

In this substage, as it is shown in FIG. 2C2, Processor 150 identifies PEF components available in General Memory 140 created in Substage B2 and specifies the PEV concepts that according to the protocol loaded in Substage A2. After, it creates the Visual Models, which specify the functionality that Processor 150 will use to display the software-type application for "the case" presenting information structures in the Input/Output Device 120, Application Interface 123. Processor 150 follows these next steps:
1. Runs through the list of PEF Concepts created in Substage B2 based on what is established in visual specification protocol (PEV).
2. For each PEV concept identified in the previous stage, it creates Visual models according to what is established in PEV protocol.
3. Create a visual model Application type with a name representing "the case".
4. Create a visual model Menu type with a representative name and a Menu Group per each of the design components, assigning the group the design component name.
5. Create two Menu items within each Menu group, one per each visual model created by a design component. For example: for class component 1, create a Menu group named "Class" and then two Menu items: one called "ABM Class 1" and another called "List Class 1". Link each Menu Item with the visual model corresponding to its name.

Visual models are edited without modifying the link between the visual model and the functional model. When editing a visual model, dimensions and locations are changed for layout components in the Input/Output Device 120 without altering the link existing between the respective visual Model and functional Model, according to what is established in the protocols loaded in Stage A.

Processor 150 stores visual models in the Database Memory 130, logical structure MV Models 134.

Stage C'. Incorporate Functional and Visual Models

In an embodiment of this invention, Stage C' is a substitute of Stage C, as it is shown in FIG. 3B.

In this stage, functional and visual models created by the user are incorporated applyinh manually the criteria of the Protocols defined in Substages A1 and A2.

By means of Input/Output Device 120, a user loads the manually created functional models into Database Memory 130, logical structure Models MF 135.

By means of Input/Output Device 120, a user loads the manually created functional models into Database Memory 130, logical structure Models MV 134.

Stage D. Read and Instantiate Functional and Visual Models as an Operable Software-Type Application In this stage, Processor 150, configured as Model Instantiator 153, has access to the Database Memory 130 with the objective of building combined models, which General Memory 140 stores. A combined model is a model that combines a functional model MF (Defined based on PEF protocol) with a Visual Model MV (Defined based on per Protocol). Hence, it represents the functionality and definition of the visual models associated to any UI resource 133, combined in a single model that is displayed in the Application Interface 123, as a software-type application accesible and operable by the user.

The result produced by Processor 150 configured as Model Instantiator 153, is displayed by means of an interpretation and delivery service for software-type applications. When a user authenticates in this service, the first thing to see is the application's interface with which to start interacting.

The interpretation, in this invention, is a process that is executed as a service and by means of reading the combined models (Models MF+Models MV+UI Resources), it solves the actions performed by the user in a software-type application displayed on the Input/Output Device 120, Application Interface 123.

As a main result of executing system 100, it is possible to obtain:
- A software-type application displayed on Application Interface 123.
- A set of user-generated information, created by interacting with the software-type application, commonly referred as "user data", which Processor 150 stores on the Database Memory 130, logical structure Object 136.

To meet this result, Processor 150, configured as Model Instantiator 153, follows these substages:

Substage D1. Read and Interprete Visual Models MV

Models (both functional and visual) are structures that respect the protocols loaded on Stage A, stored in Database Memory 130, logical structures PEF 132 and PEV 131 respectively.

In this substage, Processor 150 configured as Model Instantiator 153, recovers the visual models from Database Memory 130, logical structure Models MV 134 that are stored and validated according to the definitions from PEV protocol loaded in Substage A2.

Once the visual model is read, system 100 constructs a layout structure that arranges the disposition of the ModelObject and ActionLinks instances in the layout and stores such structure in the General Memory 140, logical structure UI Components Matrix 141.

Substage D2. Read and Interpret Functional Models MF

In this substage, Processor 150, as Model Instantiator 153, reads the functional models of Database Memory 130, logical structure Models MF 135 that are stored and validated according to the definitions on PEF protocol loaded during Substage A1.

Processor 150 from system 100 processes three types of functional models: calculation models, data persistence models and interactive data models:

Calculation Models: Process the expressions from the formula classes found in the MF repository transporting the expression to the service that solves it, returning the result in the form of an instance of ModelAttribute through FxCall.

Data persistence models: Processes the access expression to the Database Memory 130 provided by Domain classes, which act within the Object repository 136, executing those found in repository MF.

Interactive Data Models: Processes user-entered data from Application Interface 123, interactively by means of the ActionLinks per each ViewModel with which a user interacts.

Once the functional model is read, system 100 Processor 150 interprets and instantiates a business-type structure and stores it in General Memory 140, logical structure UI Components Matrix, linked to the visual structure created in Substage D1, where the links between the visual and functional models instanced respond to the logic from the protocols loaded in Stage A.

Substage D3. Select and Combine UI Resources

UI Resources are the software components pre-stored in the Database Memory 130, UI Resources logical structure, that when executed based on a visual model, render the figure onscreen within Application Interface 123. These are the definitions for processing visual models. In the Software industry, different UI resource sets are available, which can be incorporated to the system as it is shown in Substage A3 in order to offer different visualisation modes for the resulting software-type applications. To complete each fused model, system 100 selects a component from Matrix MF 142, its corresponding component from Matrix MV 143, and a UI Resource 133 compatible with the type of MV selected. Processor 150, configured as UI Combiner 152, combines components selected and delivers as argument for the functions of UI Resources, the parts of the combined model (Model MF+associated Model MV) that the component requires to function.

In this way Processor 150 presents a combined component on the Input/Output Device 120, repeating the procedure for each of the components created for "the case". A component displayed constitutes an operational screen of a software-type application that displays action buttons, data-capturing cells and other features included in the combined model. For example: A ModelClass Article that has a ModelAttribute name is displayed in an AbmViewModel that defines a screen with a TextEditor to edit the instance of ModelAttribute Name. This screen defines a function per each ActionLink from ModelView.

The view model specifies that it will use the UI component called "control TextBox 3d" to show name, and for this reason Processor 150 combines the already mentioned component that is stored in the UI Resources Memory 133 to complete the combined model. Such combination allows the name text field to be displayed on the Input/Output Device 120 with a 3d and color appearance, according to the characteristics of "control TextBox 3d" component. Component type TextEditor, is combined with UI Resource texbox 3D and it is linked to the ModelAtribute function for Processor 150 to instantiate on Application Interface 123 a box where the user can add text with a three-dimensional appearance and that supports text capture so data can be persisted into the Database Memory 130, logical structure Object 136.

Substage D4. Solve Invoked ModelClass Instances

Once combining is done in Substage D3, it is possible to find in General Memory 140, logical structure UI Components Matrix, the combined models that will form the resulting software-type application. Processor 150, configured as Model Instantiator 153, obtains the instances from the ModelObject associated to the combined model (ModelClass-ViewModel-UI Resource) that is presented to the user. The AttributeValues corresponding to the instance selected are sent to the Input/Output Device 120, Application Interface 123 according to the layout defined in the combined model and in this way an operable screen of the software-type application is presented to the user.

Substage D5. Receive and Solve User's Requests

Once there is display on the Input/Output Device 120, Application Interface 123, user interacts by pressing any button, entering any data in one of the cells, or opening any option list, or accessing any of the visual structures available. When this happens, Processor 150, configured as Model Instantiator 153, executes the function corresponding to the functional model that forms the combined model on which the user is operating, through an ActionLink or any of the existing functionalities, according to what is defined in protocol PEF loaded in Substage A1.

Substage D6. Display Updated ModelClass Instances

Once the combined model is solved, Processor 150 set as Model Instantiator 153, produces an instance update of the combined model exposed to Input/Output Device 120, Application Interface 123. Processor 150 takes the new instance and updates Input/Output Device 120 with the produced changes.

Method Application Example:

Given a case, that consists of a class diagram like the one shown in FIG. 2C1, and a screens diagram like the one shown in FIG. 2D, the method's stages are run as follows:

Stage A. Load Protocols into the Memory

This stage is considered as the system's start, as it is the only time when protocols are loaded and eventually UI Resources are added to the system.

Stage B. Identify and Store Design Components

In this stage class design and screen design for "the case" are taken and the following substages occur:

(i) Substage B1. Identify Functional Design Components

For each component within the class diagram, the corresponding PEF components are identified applying the functional specification protocol PEF loaded in Substage A1, like this:

TABLE 1

| Design Component | OO Type | Name | PEF Concept | Model Name to be created |
|---|---|---|---|---|
| Class 1 | Class | Class 1 | ModelClass | Model1 |
| Class 1 | Attribute | Attribute1 | ModelAttribute | ModelAttribute1 |
| Class 1 | Attribute | AttributeClass2_Rel1 | ModelAttribute | Model AttributeClase2_Rel1 |
| Clase 2 | Class | Class 2 | ModelClass | ModelClase 2 |
| Class 2 | Attribute | Attribute6 | ModelAttribute | ModelAttribute6 |
| Class 2 | Attribute | Attribute7 | ModelAttribute | ModelAttribute7 |
| Class 2 | Attribute | AttributeClass1_Rel1 | ModelAttribute | ModelAttributeClase1_Rel1 |
| Class 3 | Class | Class 3 | ModelClass | Model 3 |
| Class 3 | Attribute | Attribute1 | ModelAttribute | ModelAttribute1 |
| Class 3 | Attribute | Attribute2 | ModelAttribute | Model Attribute2 |
| Class 3 | Method | Calculate | Formula | Calculate |
| Class 3 | Method | Validate(Data_Validate) | Formula | Validate(Data_Validate) |
| Clase 3 | Does not exist | Data_Validate | Domain | Data_Validate |
| Class 3 | Does not exist | FxCallCalculate | FxCall | FxCallCalculate |
| Clase 3 | Does not exist | FxCall Validate | FxCall | FxCallValidate |
| Class 4 | Class | Class 4 | ModelClass | Model 4 |
| Class 4 | Attribute | Attribute3 | ModelAttribute | Model Attribute3 |
| Class 4 | Method | Find(Data_Find) | Formula | Find(Data_Find) |
| Class 4 | Does not exist | Data_Find | Domain | Data_Find |
| Clase 4 | Does not exist | FxCallFind | FxCall | FxCallFind |
| Clase 5 | Class | Class5 | ModelClass | Model 5 |
| Clase 5 | Attribute | Attribute9 | ModelAttribute | Attribute9 |
| Clase 5 | Method | Report | Formula | Report |
| Clase 5 | Does not exist | Data_Report | Domain | Data_Report |
| Clase 5 | Does not exist | FxCallReport: Data_Report | FxCall | FxCallReport: Data_Report |
| Relation1 | Attribute | Attribute8 | ModelAttribute | Model Attribute 8 |
| Relation1 | Attribute | RattributeClass1_Rel1 | ModelAttribute | Model RattributeClass1_Rel1 |
| Relation1 | Attribute | RattributeClass2_Rel1 | ModelAttribute | Model RattributeClasss2_Rel1 |

The user enters this list, columns 1, 2, and 3 (Design components, OO Type, and Name) from Table 1, through Input/Output Device 120, interface CDF 121 and Processor 150 stores it in General Memory 140, logical structure MF Matrix 142. Then, Processor 150, set as Model Validator 151, reads functional specification protocol PEF loaded in Substage A1, completes columns 3 and 4 (PEF Concept and Name of the model to be created) of Table 1 and updates General memory 140, logical structure MF Matrix 142 with these data.

(ii) Substage B2. Identify Visual Design Components

Per each of the screen designs, corresponding PEV components are identified applying the visual specification protocol PEV loaded in Substage A2, as follows:

TABLE 2

| Functional Component | PEF Concept | PEV Concept | Visual Model to be created |
|---|---|---|---|
| Class 1 | ModelClass | ABM View Model | ABM Class 1 |
| Class 1 | ModelAttribute | List View Model | List Class 1 |
| Class 1 | ModelAttribute | | |

TABLE 2-continued

| Functional Component | PEF Concept | PEV Concept | Visual Model to be created |
|---|---|---|---|
| Class 2 | ModelClass | | |
| Class 2 | ModelAttribute | ABM View Model | ABM Class 2 |
| Class 2 | ModelAttribute | List View Model | List Class 2 |
| Class 2 | ModelAttribute | | |
| Class 3 | ModelClass | | |
| Class 3 | ModelAttribute | | |
| Class 3 | ModelAttribute | | |
| Class 3 | Formula | ABM View Model | ABM Class 3 |
| Class 3 | Formula | List View Model | List Class 3 |
| Class 3 | Domain | | |
| Class 3 | FxCall | | |
| Class 3 | FxCall | | |
| Class 4 | ModelClass | | |
| Class 4 | ModelAttribute | ABM View Model | ABM Class 4 |
| Class 4 | Formula | List View Model | List Class 4 |
| Class 4 | Domain | | |
| Class 4 | FxCall | | |
| Class 5 | ModelClass | | |
| Class 5 | ModelAttribute | ABM View Model | ABM Class 5 |
| Class 5 | Formula | List View Model | List Class 5 |
| Class 5 | Domain | | |
| Class 5 | FxCall | | |
| Relacion1 | ModelAttribute | | |
| Relacion1 | ModelAttribute | List View Model | List View Relacion 1 |
| Relacion1 | ModelAttribute | Tree View Model | Tree View Relacion1 |
| Relacion1 | ModelRelationClass | | |

Processor 150, set as Model Validator 151, takes the list of functional components residing on General Memory 140, logical structure Matrix MF 142 and exposes it on the Input/Output Device 120, CDV interface 122, just as it is shown in columns 1 and 2 (Functional component, Concept PEF) from Table 2. Processor 150 reads the visual specification protocol PEV loaded in Substage A2, and completes columns 3 and 4 (PEF Concept, Visual Model to be created) and updates General Memory 140, logical structure MV Matrix 143 with these data.

Stage C. Create Functional and Visual Models

For the functional and visual components identified in Stage B from this example, the following substages occur:

(iii) Substage C1. Identify PEF Components and Create Functional Models

Processor 150 identifies the PEF components available on General Memory 140, MF Matrix 142, corresponding to columns 3 and 4 (PEF Concept and Name of the model to be created) from Table 1 and specifies PEF concepts according to the protocol loaded in Substage A1. It runs through the list, identifies the PEF concept, and creates the components defined for the mathematics in those methods that require it according to the PEF protocol definition. This specification implies to identify PEF concept and its corresponding logical structures in the Database Memory 130 in order to create functional models and store them in the logical structure Models MF 135.

In this example, the following list of functional models stored in Database Memory 130, logical structure Models MF 135 is obtained as a result of this stage:

TABLE 3

| Concept PEF | Model Name MF |
|---|---|
| ModelClass | Model1 |
| ModelAttribute | Model Attribute1 |
| ModelAttribute | Model AttributeClass2_Rel1 |
| ModelClass | Model Class 2 |
| ModelAttribute | Model Attribute6 |
| ModelAttribute | Model Attribute7 |

TABLE 3-continued

| Concept PEF | Model Name MF |
|---|---|
| ModelAttribute | Model AttributeClass1_Rel1 |
| ModelClass | Model 3 |
| ModelAttribute | Model Attribute1 |
| ModelAttribute | Model Attribute2 |
| Formula | Calculate |
| Formula | Validate (Data_Validate) |
| Domain | Data_Validate |
| FxCall | FxCallCalculate |
| FxCall | FxCallValidate |
| ModelClass | Model 4 |
| ModelAttribute | Model Attribute3 |
| Formula | Find(Data_Find) |
| Domain | Data_Find |
| FxCall | FxCallFind |
| ModelClass | Model 5 |
| ModelAttribute | Attribute9 |
| Formula | Report |
| Domain | Datos_Report |
| FxCall | FxCallReport: Data_Report |
| ModelAttribute | Model Attribute 8 |
| ModelAttribute | Model RattributeClass1_Rel1 |
| ModelAttribute | Model RattributeClass2_Rel1 |
| ModelRelationClass | Model Relation1 |

The technical structure of functional model creation can be observed in FIG. 2C1, were each component in Table 3 is exhibited, in relation to the PEF protocol concept that corresponds.

(iv) Substage C2. Identify PEV Components and Create Visual Models

Processor 150 identifies PEV components available on General Memory 140, MV Matrix 142 corresponding to columns 3 and 4 (PEF Concept, Visual Model to be created) from Table 2 and specifies PEV concepts according to the protocol loaded in Substage A2.

In this example, the following list of visual models stored win Database Memory 130, logical structure Models MV 134 is obtained as a result of this stage:

TABLE 4

| Functional Component | PEV Concept | Visual Model to be created |
|---|---|---|
| Class 1 | ABM View Model | ABM Class 1 |
| Class 1 | List View Model | List Class 1 |
| Class 1 | | |
| Class 2 | ABM View Model | ABM Class 2 |
| Class 2 | List View Model | List Class 2 |
| Class 2 | | |
| Class 2 | | |
| Class 3 | ABM View Model | ABM Class 3 |
| Class 3 | List View Model | List Class 3 |
| Class 3 | | |
| Class 3 | | |
| Class 3 | | |
| Class 3 | | |
| Class 3 | | |
| Class 4 | ABM View Model | ABM Class 4 |
| Class 4 | List View Model | List Class 4 |
| Class 4 | | |
| Class 4 | | |
| Class 4 | | |
| Class 5 | ABM View Model | ABM Class 5 |
| Class 5 | List View Model | List Class 5 |
| Class 5 | | |
| Class 5 | | |
| Class 5 | | |
| Relation1 | List View Model | List View Relacion 1 |
| Relation1 | Tree View Model | Tree View Relation1 |
| Relation1 | | |
| Relation1 | | |

Stage D. Read and Instantiate Functional and Visual Models as an Operable Software-Type Application Substage D1. Read and Interpret Visual Models MV The invention's process pointed out in Substage D1 is executed based on the list from the example in Table 4.

Substage D2. Read and Interpret Functional Models MF.

The invention's process pointed in Substage D2 is executed based on the list from the example in Table 3.

Substage D3. Select and Compile UI Resources

Selected UI Resources are combined to display the screens required from screen design, until achieving a visual design like the one shown in FIG. 2D.

Substage D4. Solve Invoked ModelClass Instances

As the user operates the Application Interface, the system responds by executing the actions listed in Substage D4 from this invention.

The following substages are produced while the user interacts with the example's resulting application:

Substage D5. Receive and Solve the User's Requests

Substage D6. Expose Updated ModelClass Instances

It must be understood that this invention is not limited to the embodiments described and illustrated, because as it will be obvious for an expert on the art, there are different variations and possible modifications that do not strive away from the invention's essence, which is only defined by the following claims.

The invention claimed is:

1. A computer-implemented method for automatic instantiating and displaying software-type applications based on software design specifications, the method comprising the following stages:
 a. loading, through an input/output device that is connected to a central processing unit (CPU), a functional specification protocol (PEF), a visual specification protocol (PEV), and user interface (UI) resources, and store them in a database memory that is connected to the CPU;
 b. identifying and storing functional and visual design components based on software design specifications in the database memory, the identifying and storing steps comprises the following substages:
  identifying the functional design components based on class design loaded from memories or input/output devices, and
  identifying the visual design components based on a screen design that was loaded from memories or input/output devices;
 c. creating functional and visual models based on the functional and visual design components identified in stage b, and store such functional and visual models in the database memory, logical structures functional models (MF) and visual models (MV) respectively, wherein creating functional and visual models comprises:
 processing, through the central processing unit, functional specification protocol (PEF) to identify functional components, and create functional models with functional objects based on the identified functional components; and
 processing, through the central processing unit, visual specification protocol (PEV) to identify visual components, and create visual models with functional content in the visual models based on the identified visual components; and
 d. reading, instantiating, and automatically displaying on input/output device, an application interface, together with the functional and visual models created in stage c, combined with UI resources following the norms from protocols stored in stage a, using a processor, set as model instantiator.

2. The method of claim 1 where the stage d comprises the following substages:
 a. reading and processing, through the central processing unit, visual models;
 b. reading and processing, through the central processing unit, functional models;
 c. processing, through the central processing unit, functional models to select and combine with user's interface components;
 d. processing, through the central processing unit, components of functional models to solve the instances of the metaclasses invoked by a user through interacting with input/output devices;
 e. receiving and resolving user requests sent through the input/output devices and process the user requests by the central processing unit; and
 f. showing updated metaclass instances on display devices.

3. The method of claim 1 where the stage b comprises the following steps:
 a. processing, through the central processing unit, functional diagrams stored in the database memory to identify classes included in the functional diagram; and
 b. identifying name of each class of the classes and store the name of each class of the classes in the database memory.

4. The method of claim 1 where the stage b comprises the following steps:
 a. creating visual models based on classes identified applying the visual specification protocol and storing the visual specification protocol in the database memory; and b. editing appearance of the created visual models and store the appearance in the database memory using input/output devices in case it is required.

5. The method of claim 1 wherein substage a comprises the following steps:
   a. processing, through the central processing unit a list of functional models to create objects included in such functional models following the functional specification protocol loaded into the database memory for each of the components; and
   b. processing, through the central processing unit, components of the functional diagrams associated to a mathematical formula to create additional components that enable the execution of such formula and store it in the database memory.

6. The method of claim 1 wherein substage b comprises the following steps:
   a. processing, through the central processing unit, a list of functional specification protocol concepts (PEF concepts) stored in the database memory in order to define, for each functional content, a concept from the visual specification protocol (PEV);
   b. creating visual models for each functional concept and store them in the database memory;
   c. creating a visual model for the application using a representative case name and storing it in the data base memory; and
   d. creating a menu-type visual model using a representative name and a menu group for each of the design components, assigning the group the design component name and storing it in the data base memory.

7. A system for instantiating and exposing operational software-type applications based on software design specifications, the system comprises:
   a. an input/output device including functional design components (CDF) interface, visual design components (CDV) interface, and application interface in order to enter software design specifications and display the resulting software-type applications;
   b. a central processing unit (CPU) connected to the input/output device, containing:
      a general memory communicated with input/output device, which interacts with a processor, set to store in a volatile way functional design components and visual design components, as well as user interface (UI) components; and
      the processor set to receive at least one software design specification from the input/output device, the processor set as model validator to validate the at least one software design specification against protocols residing in a database memory, and identify a resulting software type application, integrating functional and visual models, the processor set as user interface (UI) combiner, to combine the resulting software-type application, joining functional and visual models, and UI resources, and the processor set as model instantiator to display the resulting software-type application on the application interface; and
   c. a database memory connected to CPU, paired with the processor, configured to store statically visual specification protocol (PEV) in a logical structure (PEF) and user interface (UI) resources in a logical structure of UI resources, and also set to dynamically store visual models inside a logical structure visual models MV, functional models in a logical structure functional models (MF) and objects inside a logical structure objects;
   wherein the central processing unit performing:
   recovering all design models stored in the input/output device and process validation of all the design models against functional validation protocols (PEF) loaded in the database memory;
   recovering design models of user interfaces stored in the input/output device and process validation of the design models of user interfaces against visual validation protocols (PEV) loaded in the database memory;
   processing the interpretation of functional models and store in the database memory;
   processing the interpretation of the visual models and store in the database memory;
   recovering the functional models and visual models from the database memory and create user interface based on carry out combining and interaction processing between the functional models and visual models, store the user interfaces in the database memory and display the resulting software-type application on the input/output devices.

8. The system of claim 7 wherein the input/output device is characterized by:
   a. allowing entering of functional diagrams into a general memory that will be recovered by the central processing unit to create functional models;
   b. allowing entering of screen designs into the general memory that will be recovered by the central processing unit to create visual models.

* * * * *